(12) United States Patent
Kim

(10) Patent No.: US 11,960,005 B2
(45) Date of Patent: Apr. 16, 2024

(54) METHOD AND APPARATUS FOR TRACKING OBJECT USING LIDAR SENSOR AND RECORDING MEDIUM STORING PROGRAM TO EXECUTE THE METHOD

(71) Applicants: Hyundai Motor Company, Seoul (KR); Kia Corporation, Seoul (KR)

(72) Inventor: Hyun Ju Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 404 days.

(21) Appl. No.: 17/460,858

(22) Filed: Aug. 30, 2021

(65) Prior Publication Data

US 2023/0213654 A1 Jul. 6, 2023

(30) Foreign Application Priority Data

Dec. 30, 2020 (KR) .................. 10-2020-0187720

(51) Int. Cl.
*G01S 17/66* (2006.01)
*G01S 17/89* (2020.01)
*G01S 17/931* (2020.01)

(52) U.S. Cl.
CPC ............ *G01S 17/66* (2013.01); *G01S 17/89* (2013.01); *G01S 17/931* (2020.01)

(58) Field of Classification Search
CPC ........ G01S 17/66; G01S 17/89; G01S 17/931; G01S 17/42; G01S 7/4808; G01S 7/497; G06T 7/11; G06T 2207/10048
See application file for complete search history.

(56) References Cited

U.S. PATENT DOCUMENTS

| 2018/0229724 | A1* | 8/2018 | Gutmann | B60W 10/04 |
|---|---|---|---|---|
| 2019/0130191 | A1* | 5/2019 | Zhou | G06V 20/52 |
| 2019/0130586 | A1* | 5/2019 | Zhou | G06T 7/90 |
| 2020/0125112 | A1* | 4/2020 | Mao | G01S 7/4802 |
| 2020/0410716 | A1* | 12/2020 | Seo | G06V 10/25 |
| 2021/0319592 | A1* | 10/2021 | Tsai | G06T 17/205 |
| 2022/0058400 | A1* | 2/2022 | Bianconcini | G06T 7/521 |
| 2022/0144206 | A1* | 5/2022 | Wang | B60W 50/14 |
| 2022/0153276 | A1* | 5/2022 | Steyer | B60W 60/0015 |
| 2023/0224482 | A1* | 7/2023 | Takahashi | H04N 19/33 |

* cited by examiner

Primary Examiner — Amara Abdi
(74) Attorney, Agent, or Firm — Fox Rothschild LLP

(57) ABSTRACT

An object-tracking method using a LiDAR sensor includes generating current shape information about a current tracking box at a current time from an associated segment box, using history shape information accumulated prior to the current time with respect to a target object that is being tracked, and updating information on a previous tracking box at a time prior to the current time, contained in the history shape information, using the current shape information and the history shape information and determining a previous tracking box having the updated information to be a final output box containing information on the shape of the target object.

16 Claims, 17 Drawing Sheets

METHOD AND APPARATUS FOR TRACKING OBJECT USING LIDAR SENSOR AND RECORDING MEDIUM STORING PROGRAM TO EXECUTE THE METHOD

This application claims under 35 U.S.C. § 119(a) the benefit of Korean Patent Application No. 10-2020-0187720, filed on Dec. 30, 2020, the entire contents of which are incorporated by reference herein.

BACKGROUND

(a) Technical Field

The present disclosure relates to a method and an apparatus for tracking an object using a LiDAR sensor, and a recording medium storing a program to execute the method.

(b) Description of the Related Art

A highway driving pilot (HDP) system of a vehicle is a system that maintains a speed of the vehicle according to conditions set by a driver about the speed of the vehicle and a distance to a preceding vehicle traveling in a same lane as the vehicle, without operation of an accelerator pedal or a brake pedal by the driver.

For example, information on a target vehicle may be obtained using a light detection and ranging (LiDAR) sensor, and an HDP function may be performed using the obtained information. However, if the information on the target vehicle obtained using the LiDAR sensor is inaccurate or contains an error, the HDP function may be erroneously performed, leading to deterioration in the reliability of tracking the target vehicle.

SUMMARY

The present disclosure is directed to a method and an apparatus for tracking an object using a LiDAR sensor, and a recording medium storing a program to execute the method.

Embodiments according to the present disclosure enable tracking the object using the LiDAR sensor in which tracking of the object is performed with high accuracy.

A method of tracking an object using a LiDAR sensor according to an embodiment may include determining a reference point of an associated segment box related to a target object generated from point cloud data, checking an association between points of the associated segment box and history shape information accumulated prior to a current time with respect to the target object and generating information on points of a current tracking box at the current time that match points of the associated segment box using the association, determining a heading of the current tracking box using heading information included in the history shape information based on a reference point among the points of the current tracking box, obtaining the length and the width of the current tracking box using the determined heading, and updating information on a tracking box generated prior to the current time, included in the history shape information, using the heading, the length and the width of the current tracking box and determining the tracking box having the updated information to be a final output box containing information on the shape of the target object.

A method of tracking an object using a LiDAR sensor according to another embodiment may include generating current shape information about a current tracking box at a current time from an associated segment box using history shape information accumulated prior to the current time with respect to a target object that is being tracked and updating information on a previous tracking box at a time prior to the current time, contained in the history shape information, using the current shape information and the history shape information and determining a previous tracking box having the updated information to be a final output box containing information on the shape of the target object.

For example, the method may further include clustering point cloud data obtained using the LiDAR sensor, obtaining a plurality of segment boxes from the result of the clustering, and selecting the associated segment box associated with the target object from among the plurality of segment boxes related to the target object.

For example, the generating the current shape information may include determining a reference point of the associated segment box, checking the association between points of the associated segment box and the history shape information and generating information on points of the current tracking box that match the points of the associated segment box using the association, determining a heading of the current tracking box using heading information included in the history shape information based on a reference point among the points of the current tracking box, and generating information on the length and the width of the current tracking box using the determined heading.

For example, the method may further include generating the current shape information about the current tracking box based on the reference point of the associated segment box obtained when a current tracking channel tracking the target object is initially generated.

For example, the generating the information on the points of the current tracking box may include: generating sets of points of the previous tracking box and the points of the associated segment box as follows:

$$\begin{bmatrix} P_{(t-1)0} \\ P_{(t-1)1} \\ P_{(t-1)2} \\ P_{(t-1)3} \end{bmatrix} \bigcup_{n=4} \text{each} \begin{bmatrix} P_0 \\ P_1 \\ P_2 \\ P_3 \end{bmatrix} =$$

$$\begin{bmatrix} (P_{(t-1)0}, P_0)(P_{(t-1)1}, P_1)(P_{(t-1)2}, P_2)(P_{(t-1)3}, P_3) \\ (P_{(t-1)0}, P_1)(P_{(t-1)1}, P_2)(P_{(t-1)2}, P_3)(P_{(t-1)3}, P_0) \\ (P_{(t-1)0}, P_2)(P_{(t-1)1}, P_3)(P_{(t-1)2}, P_0)(P_{(t-1)3}, P_1) \\ (P_{(t-1)0}, P_3)(P_{(t-1)1}, P_0)(P_{(t-1)1}, P_0)(P_{(t-1)3}, P_2) \end{bmatrix}$$

where $P_{(t-1)0}$, $P_{(t-1)1}$, $P_{(t-1)2}$ and $P_{(t-1)3}$ represent the points of the previous tracking box, and $P_0$, $P_1$, $P_2$ and $P_3$ represent the points of the associated segment box; calculating Euclidean distance values for the sets as follows:

$$_0^n\gamma = \sqrt{(x_{(t-1)0}^2 + x_0^2) + (y_{(t-1)0}^2 + y_0^2)}$$

$$_1^n\gamma = \sqrt{(x_{(t-1)0}^2 + x_1^2) + (y_{(t-1)1}^2 + y_1^2)}$$

$$_2^n\gamma = \sqrt{(x_{(t-1)2}^2 + x_2^2) + (y_{(t-1)2}^2 + y_2^2)}$$

$$_3^n\gamma = \sqrt{(x_{(t-1)3}^2 + x_3^2) + (y_{(t-1)3}^2 + y_3^2)}$$

where $_0^n\gamma$, $_1^n\gamma$, $_2^n\gamma$ and $_3^n\gamma$ represent the Euclidean distance values, and where, in a space where the point cloud data is distributed, $x_{(t-1)0}$ and $y_{(t-1)0}$ respectively represent the vertical coordinate and the horizontal coordinate of $P_{(t-1)0}$, $x_{(t-1)1}$ and $y_{(t-1)1}$ respectively represent the vertical coordinate and the horizontal coordinate of $P_{(t-1)1}$, $x_{(t-1)2}$ and $y_{(t-1)2}$ respectively represent the vertical coordinate and the horizontal coordinate of $P_{(t-1)2}$, $x_{(t-1)3}$ and $y_{(t-1)3}$ respectively represent the vertical coordinate and the horizontal coordinate of $P_{(t-1)3}$, $x_0$ and $y_0$ respectively represent the vertical coordinate and the horizontal coordinate of $P_0$, $x_1$ and $y_1$ respectively represent the vertical coordinate and the horizontal coordinate of $P_1$, $x_2$ and $y_2$ respectively represent the vertical coordinate and the horizontal coordinate of $P_2$, $x_3$ and $y_3$ respectively represent the vertical coordinate and the horizontal coordinate of $P_3$, and $n=\{0, 1, 2, 3\}$;

selecting the combination having the highest degree of coupling from among four combinations using the Euclidean distance values as follows:

$$\delta_0 = ({}_0^0\gamma + {}_1^0\gamma + {}_2^0\gamma + {}_3^0\gamma)$$

•

•

•

$$\delta_3 = ({}_0^3\gamma + {}_1^3\gamma + {}_2^3\gamma + {}_3^3\gamma)$$

$$\delta_n = ({}_0^n\gamma + {}_1^n\gamma + {}_2^n\gamma + {}_3^n\gamma)$$

where $\delta_0$ to $\delta_3$ represent the four combinations, and the combination having the highest degree of coupling corresponds to the combination having the smallest value among $\delta_0$ to $\delta_3$; and determining, among the matching relationships between points of the four combinations shown below, points of the current tracking box using the matching relationships corresponding to the selected combination:

|  | ${}_0^n\gamma$ | ${}_1^n\gamma$ | ${}_2^n\gamma$ | ${}_3^n\gamma$ |
|---|---|---|---|---|
| $\delta_0$ | $(P_{t0}, P_0)$ | $(P_{t1}, P_1)$ | $(P_{t2}, P_2)$ | $(P_{t3}, P_3)$ |
| $\delta_1$ | $(P_{t0}, P_1)$ | $(P_{t1}, P_1)$ | $(P_{t2}, P_3)$ | $(P_{t3}, P_0)$ |
| $\delta_2$ | $(P_{t0}, P_2)$ | $(P_{t1}, P_3)$ | $(P_{t2}, P_0)$ | $(P_{t3}, P_1)$ |
| $\delta_3$ | $(P_{t0}, P_3)$ | $(P_{t1}, P_0)$ | $(P_{t2}, P_1)$ | $(P_{t3}, P_2)$ | where $P_{t0}$, $P_{t1}$, $P_{t2}$ and $P_{t3}$ represent the points of the current tracking box.

For example, the heading of the current tracking box may be determined as follows:

$$\theta_{BoxHeading} = \min(|\widehat{H_{t-1}} - H_0|, |\widehat{H_{t-1}} - H_1|, |\widehat{H_{t-1}} - H_2|, |\widehat{H_{t-1}} - H_3|)$$

where $\theta_{BoxHeading}$ represents the heading of the current tracking box, $\widehat{H_{t-1}}$ represents heading information included in the history shape information, $H_0$, $H_1$, $H_2$ and $H_3$ represent candidate headings of the current tracking box, and $\min(A, B, C, D)$ represents a candidate heading that is used when the smallest value among A, B, C and D is calculated.

For example, the generating the current shape information may include determining the distance between two vertices forming a line segment oriented parallel to the heading of the current tracking box to be the length of the current tracking box and determining the distance between two vertices forming a line segment oriented perpendicular to the heading of the current tracking box to be the width of the current tracking box.

An apparatus for tracking an object using a LiDAR sensor according to still another embodiment may include a current shape information generation unit, configured to generate current shape information about a current tracking box at a current time from an associated segment box using history shape information accumulated prior to the current time with respect to a target object that is being tracked, and a final output box output unit, configured to update information on a previous tracking box at a time prior to the current time, contained in the history shape information, using the current shape information and the history shape information and to output a previous tracking box having the updated information as a final output box containing information on the shape of the target object.

For example, the apparatus may further include a clustering unit, configured to cluster point cloud data obtained using the LiDAR sensor, a shape analysis unit, configured to obtain a plurality of segment boxes from the result of clustering by the clustering unit, and an associated segment box selection unit, configured to select the associated segment box associated with the target object from among the plurality of segment boxes related to the target object.

For example, the current shape information generation unit may include a reference point determination unit, configured to determine a reference point of the associated segment box, a point information generation unit configured to check the association between points of the associated segment box and the history shape information and to generate information on points of the current tracking box that match the points of the associated segment box using the association, a heading determination unit, configured to determine a heading of the current tracking box using heading information included in the history shape information based on a reference point among the points of the current tracking box, and a length/width determination unit, configured to determine information on the length and the width of the current tracking box using the determined heading.

For example, the current shape information generation unit may further include an initialization unit configured to generate the current shape information about the current tracking box based on the reference point of the associated segment box when a current tracking channel tracking the target object is initially generated.

According to still another embodiment, a non-transitory computer-readable recording medium in which a program for executing a method of tracking an object using a LiDAR sensor is recorded may store a program to implement a function of generating current shape information about a current tracking box at a current time from an associated segment box using history shape information accumulated prior to the current time with respect to a target object that is being tracked and a function of updating information on a previous tracking box at a time prior to the current time, contained in the history shape information, using the current shape information and the history shape information and determining a previous tracking box having the updated information to be a final output box containing information on the shape of the target object.

For example, the program may further implement a function of clustering point cloud data obtained using the LiDAR sensor, a function of obtaining a plurality of segment boxes from the result of clustering, and a function of selecting the associated segment box associated with the target object from among the plurality of segment boxes related to the target object.

For example, the function of generating the current shape information may include a function of determining a reference point of the associated segment box, a function of checking the association between points of the associated segment box and the history shape information and generating information on points of the current tracking box that match the points of the associated segment box using the association, a function of determining a heading of the current tracking box using heading information included in the history shape information based on a reference point among the points of the current tracking box, and a function of generating information on the length and the width of the current tracking box using the determined heading.

For example, the function of generating the current shape information may further include a function of generating the current shape information about the current tracking box based on the reference point of the associated segment box obtained when a current tracking channel tracking the target object is initially generated.

BRIEF DESCRIPTION OF THE DRAWINGS

Arrangements and embodiments may be described in detail with reference to the following drawings, in which like reference numerals refer to like elements and wherein.

DETAILED DESCRIPTION OF THE DISCLOSURE

Figure 1:
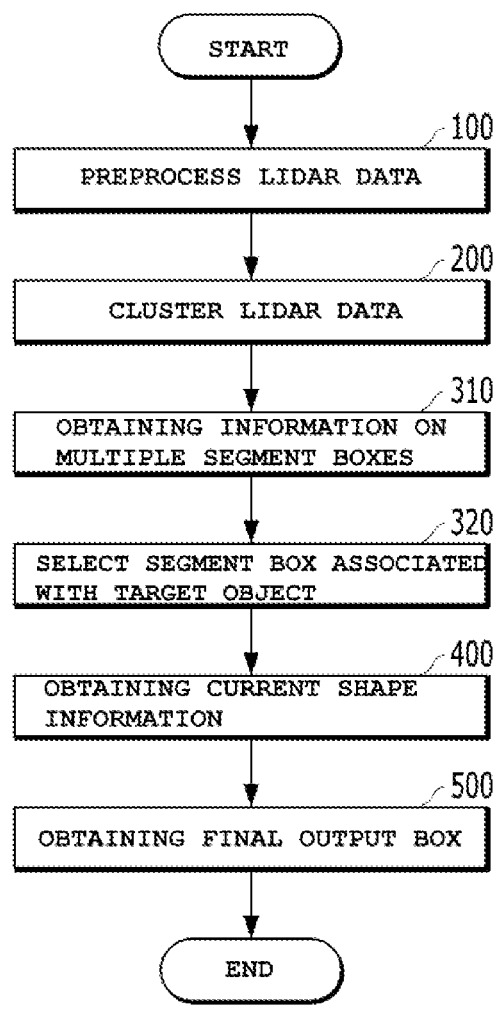
FIG. 1 is a flowchart for explaining an object-tracking method using a LiDAR sensor according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method and apparatus 600 for tracking an object using a light detection and ranging (LiDAR) sensor 710 and a vehicle 1000 using the same according to embodiments will be described with reference to the accompanying drawings. The method and apparatus 600 for tracking an object using the LiDAR sensor 710 and the vehicle 1000 using the same will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely.

Figure 2:
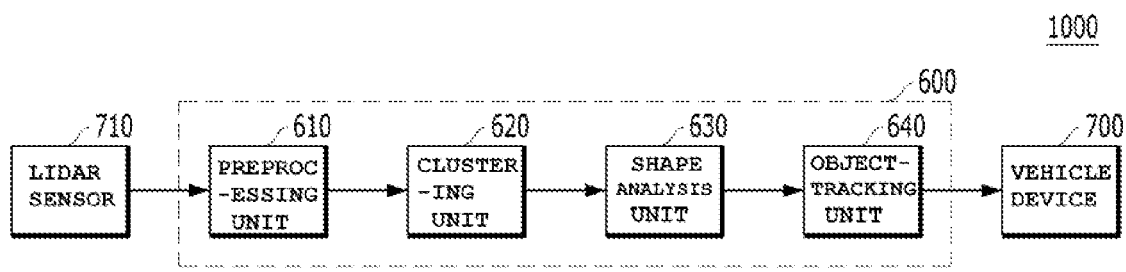
FIG. 2 is a block diagram of a vehicle including an object-tracking apparatus using a LiDAR sensor according to an embodiment.

FIG. 1 is a flowchart for explaining an object-tracking method using the LiDAR sensor 710 according to an embodiment, and FIG. 2 is a block diagram of the vehicle 1000 including the object-tracking apparatus 600 using the LiDAR sensor 710 according to an embodiment.

For convenience of description, the object-tracking method shown in FIG. 1 will be described as being performed by the object-tracking apparatus 600 shown in FIG. 2, but the embodiments are not limited thereto. That is, according to another embodiment, the object-tracking method shown in FIG. 1 may be performed by an object-tracking apparatus having a configuration different from that of the object-tracking apparatus 600 shown in FIG. 2. In addition, the object-tracking apparatus 600 shown in FIG. 2 will be described as performing the object-tracking method shown in FIG. 1, but the embodiments are not limited thereto. That is, according to another embodiment, the object-tracking apparatus 600 shown in FIG. 2 may perform an object-tracking method having processes different from those of the object-tracking method shown in FIG. 1.

The vehicle 1000 according to an embodiment may include the LiDAR sensor 710 and the object-tracking apparatus 600.

The object-tracking apparatus 600 using the LiDAR sensor 710 may include a clustering unit 620, a shape analysis unit (or a segment unit) 630, and an object-tracking unit (a tracking unit, a tracking and classification unit, or an object-detecting unit) 640. In addition, the object-tracking apparatus 600 may further include a preprocessing unit 610.

The LiDAR sensor 710 may radiate a single circular laser pulse having a wavelength of, for example, 905 nm to 1550 nm to an object, and may measure the time taken for the laser pulse reflected from the object present within a measurement range to return, thereby detecting information on the object, for example, the distance from the LiDAR sensor 710 to the object, the orientation of the object, the speed of the object, the temperature of the object, the material distribution of the object, and the concentration characteristics of the object. Here, the object may be, for example, another vehicle, a person, or an obstacle present outside the vehicle 1000 in which the LiDAR sensor 710 is mounted (hereinafter referred to as the "host vehicle"). However, the embodiments are not limited to any specific type of object.

The LiDAR sensor 710 may include a transmitter (not shown), which transmits a laser pulse, and a receiver (not shown), which receives the laser reflected from the surface of an object present within a detection range. The receiver has a predetermined field of view (FOV), which is a range that the LiDAR sensor 710 is capable of observing at one time without moving or rotating.

Since the LiDAR sensor 710 exhibits higher detection accuracy in vertical/horizontal directions than a radio detecting and ranging (RaDAR) sensor, the LiDAR sensor 710 is capable of providing accurate vertical/horizontal-directional position information, and is thus advantageously used for obstacle detection and vehicle position recognition. As examples of the LiDAR sensor 710, there are a two-dimensional (2D) LiDAR sensor and a three-dimensional (3D) LiDAR sensor. The 2D LiDAR sensor is configured to be tiltable or rotatable, and is used to obtain LiDAR data including 3D information through tilting or rotation. The 3D LiDAR sensor is capable of obtaining a plurality of 3D points and thus of predicting the height information of an obstacle, thus helping in accurate and precise detection and tracking of an object. The 3D LiDAR sensor may be composed of multiple 2D LiDAR sensor layers, and may generate LiDAR data including 3D information.

The LiDAR sensor 710 outputs point cloud data (hereinafter referred to as "LiDAR data") composed of a plurality of points related to a single object. The LiDAR sensor 710 may be located on at least one of the front portion, the side portion, or the rear portion of the vehicle 1000. However, the method and apparatus 600 for tracking an object and the vehicle 1000 including the same according to the embodiments are not limited to any specific position at which the LiDAR sensor 710 is mounted to the vehicle 1000.

Further, the method and apparatus 600 for tracking an object according to the embodiments are not limited to any specific shape, position, or type of LiDAR sensor 710.

The object-tracking apparatus 600 may receive LiDAR data, and may use the same to determine the presence or absence of an object, to start, continue, or stop tracking an object, to update, store, or delete information on an object, and to classify the type of object.

The preprocessing unit 610 may preprocess LiDAR data (step 100). To this end, the preprocessing unit 610 may perform calibration to match the coordinates between the LiDAR sensor 710 and the vehicle 1000. That is, the preprocessing unit 610 may convert LiDAR data into data suitable for the reference coordinate system according to the positional angle at which the LiDAR sensor 710 is mounted to the vehicle 1000. In addition, the preprocessing unit 610 may perform filtering to remove points having low intensity or reflectance using intensity or confidence information of the LiDAR data.

In addition, the preprocessing unit 610 may remove data reflected by the body of the host vehicle 1000. That is, since there is a region that is shielded by the body of the host vehicle 1000 according to the mounting position and the field of view of the LiDAR sensor 710, the preprocessing unit 610 may remove data reflected by the body of the host vehicle 1000 using the reference coordinate system.

In the object-tracking method according to the embodiment, step 100 may be omitted. In this case, the preprocessing unit 610 may be omitted from the object-tracking apparatus 600 according to the embodiment.

After step 100, the clustering unit 620 groups the point cloud data, which is the LiDAR data consisting of a plurality of points related to the object obtained through the LiDAR sensor 710, into meaningful units according to a predetermined criterion (step 200). In the case in which step 100, which is the preprocessing step, and the preprocessing unit 610 are not omitted, the clustering unit 620 may group the LiDAR data preprocessed by the preprocessing unit 610. For example, the clustering unit 620 may group the point cloud data by applying vehicle modeling or guardrail modeling thereto to perform clustering to determine the contour of the object. The result detected by the LiDAR sensor 710 shows a plurality of points, each of which has only position information. Accordingly, the clustering unit 620 serves to group the plurality of points detected by the LiDAR sensor 710 into meaningful shape units.

After step 200, the shape analysis unit 630 generates information on a plurality of segment boxes for each channel using the result of clustering by the clustering unit 620 (step 310). Here, the segment box may be the result of converting the result of clustering into a geometric box shape. In addition, the information on the segment box may be at least one of the width, length, position, or direction (or heading) of the segment box. The channel will be described later in detail with reference to FIGS. 4A to 4C.

Figure 3:
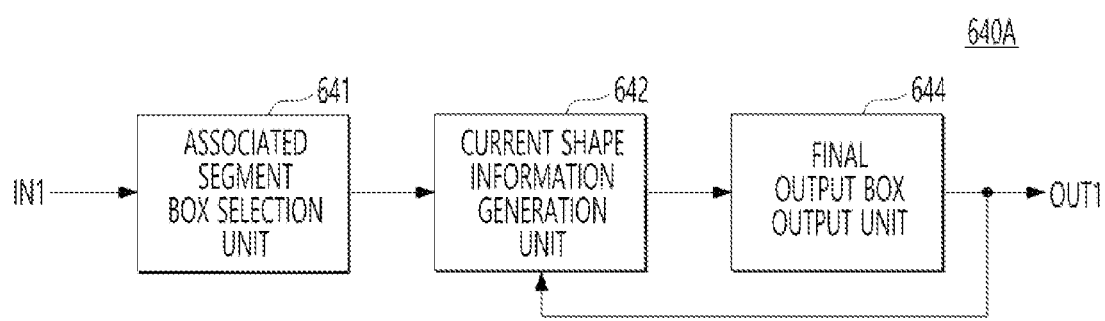
FIG. 3 is a block diagram of an embodiment of the object-tracking unit shown in FIG. 2.

FIG. 3 is a block diagram of an embodiment 640A of the object-tracking unit 640 shown in FIG. 2.

The object-tracking unit 640A shown in FIG. 3 may include an associated segment box selection unit 641, a current shape information generation unit 642, and a final output box output unit 644.

For convenience of description, step 320, step 400 and step 500 shown in FIG. 1 will be described as being performed by the object-tracking unit 640A shown in FIG. 3, but the embodiments are not limited thereto. That is, according to another embodiment, step 320, step 400 and step 500 shown in FIG. 1 may be performed by an object-tracking unit having a configuration different from that of the object-tracking unit 640A shown in FIG. 3. In addition, the object-tracking unit 640A shown in FIG. 3 will be described as performing step 320, step 400 and step 500 shown in FIG. 1, but the embodiments are not limited thereto. That is, according to another embodiment, the object-tracking unit 640A shown in FIG. 3 may perform a step having processes different from those of step 320, step 400 and step 500 shown in FIG. 1.

After step 310, the associated segment box selection unit 641 of the object-tracking unit 640A selects a segment box in association with an object that is being tracked (hereinafter referred to as a "target object") at a current time t (or a final segment box or an associated segment box) (hereinafter referred to as an "associated segment box"), among a plurality of segment boxes for each channel, received from the shape analysis unit 630 through an input terminal IN1, and outputs the selected associated segment box to the current shape information generation unit 642. Here, the term "association" is a process of selecting the segment box that is to be used to maintain tracking of a target object that is currently being tracked, among a plurality of pieces of information on the segment boxes obtained for the target object according to the visibility of the LiDAR sensor 710 and the shape of the target object. This association may be performed at a predetermined period.

For example, in order to select an associated segment box from among the plurality of segment boxes provided by each channel from the shape analysis unit 630, the associated segment box selection unit 641 may convert information on each of the plurality of segment boxes into a predetermined format, and may select an associated segment box from among the plurality of segment boxes having the converted format (or segment boxes of a meta object).

Hereinafter, step 400 and step 500 shown in FIG. 2 will be described as being performed on the associated segment box, but the embodiments are not limited thereto. Step 400 and step 500 shown in FIG. 2 may also be performed on each of the plurality of segment boxes.

The following description of step 400 and step 500 according to the embodiment is not limited to the presence or absence of step 100 or to any specific method of performing the preprocessing process in step 100, the clustering process in step 200, the process of generating segment box information in step 310, or the process of selecting an associated segment box in step 320. Similarly, the following description of the object-tracking unit 640 (640A) according to the embodiment is not limited to the presence or absence of the preprocessing unit 610 or to any specific type of operation performed by the preprocessing unit 610, the clustering unit 620, or the shape analysis unit 630. That is, step 400, step 500, and the object-tracking unit 640A according to the embodiments may also be applied when the preprocessing unit 610 is omitted (i.e. when step 100 is omitted), when the preprocessing unit 610 performing step 100 processes LiDAR data in a manner different from that described above, when the clustering unit 620 performing step 200 clusters LiDAR data in a manner different from that described above, when the shape analysis unit 630 performing step 310 generates segment box information in a manner different from that described above, or when the associated segment box selection unit 641 of the object-tracking unit 640A performing step 320 selects an associated segment box in a manner different from that described above.

Figure 4A:
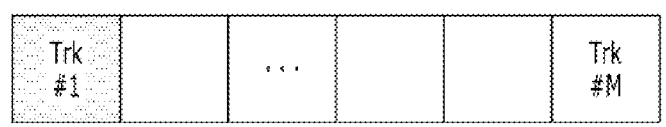
FIGS. 4A to 4C are diagrams for explaining the format of data processed by the object-tracking unit.
Figure 4B:
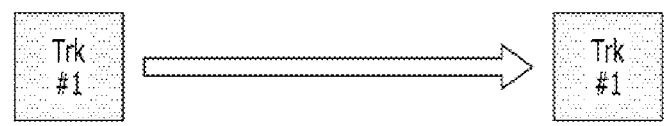
Figure 4C:
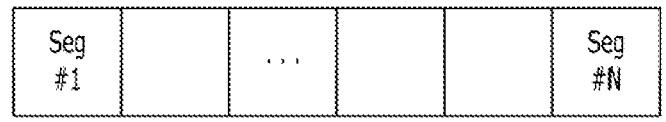

FIGS. 4A to 4C are diagrams for explaining the format of data (i.e. segment box information) processed by the object-tracking unit 640 (640A).

The method and apparatus 600 for tracking an object according to the embodiments may track "M" target objects. Here, "M" is a positive integer of 1 or more. That is, the number M of target objects that may be tracked is the number M of tracks Trk shown in FIG. 4A. In addition, the unit in which history information on a unit target object is stored is referred to as a "channel", and the number of channels may be the same as the number of tracks Trk. In this case, the history shape information may be information accumulated in each channel prior to the current time t with respect to the target object that is being tracked. The history information may include, for example, position information and speed information of the target object, measured by time.

In addition, "N" segment boxes Seg #1 to Seg #N may be generated at the current time t with respect to the unit target object by the shape analysis unit 630, and may be provided to the associated segment box selection unit 641 of the object-tracking unit 640A. Here, "N" is a positive integer of 1 or more, and may be the same as or different from "M". Hereinafter, "N" will be described as being a positive integer of 2 or more, but the following description may also apply to a configuration in which "N" is 1. That is, as shown in FIG. 4C, "N" segment boxes Seg #1 to Seg #N may be present in each Trk #m (1≤m≤M) of the first to $M^{th}$ channels Trk #1 to Trk #M.

The associated segment box selection unit 641 of the object-tracking unit 640A may select a segment box associated with a target object that is being tracked at the current time t in each channel, among the "N" segment boxes Seg #1 to Seg #N belonging to each of the first to $M^{th}$ channels, as the associated segment box (step 320).

Step 400 and step 500, which will be described below, may be performed every a predetermined period T from the time at which the current tracking channel is initially generated to the time at which the current tracking channel is extinguished. Thus, step 400 and step 500, which will be described below and are performed at the current time t, may also be identically performed at a time t-T prior to the current time t, and may also be identically performed at a time t+T subsequent to the current time t. Hereinafter, on the assumption that T is 1, the current time is denoted by "t", the previous time is denoted by "t−1", and the subsequent time is denoted by "t+1".

After step 320, the current shape information generation unit 642 generates shape information (hereinafter referred to as "current shape information") about a tracking box at the current time t (hereinafter referred to as a "current tracking box") from the associated segment box at the current time t using the history shape information accumulated prior to the current time t with respect to the target object that is being tracked (step 400).

Figure 5:
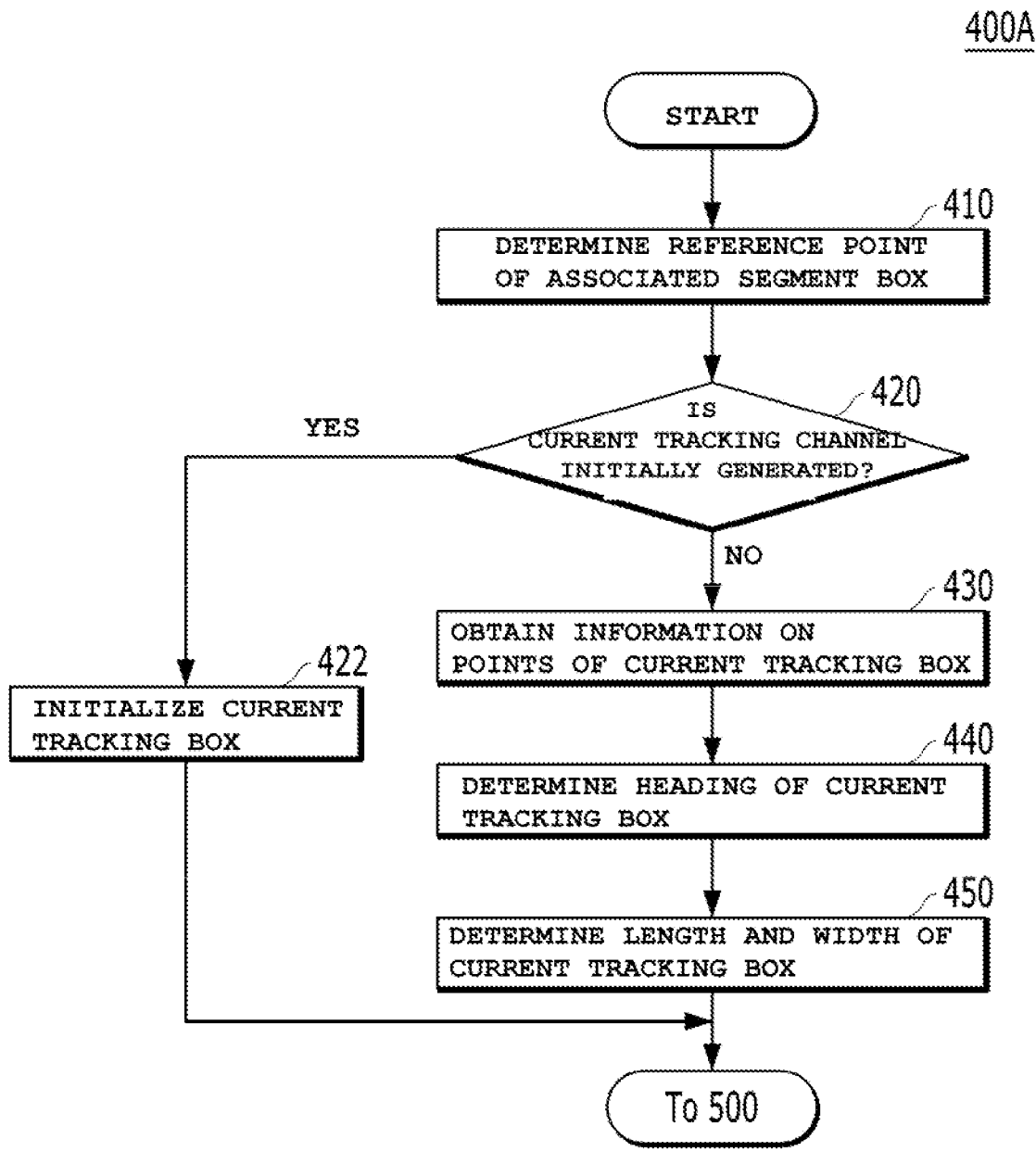
FIG. 5 is a flowchart of an embodiment of step 400 shown in FIG. 1.
Figure 6:
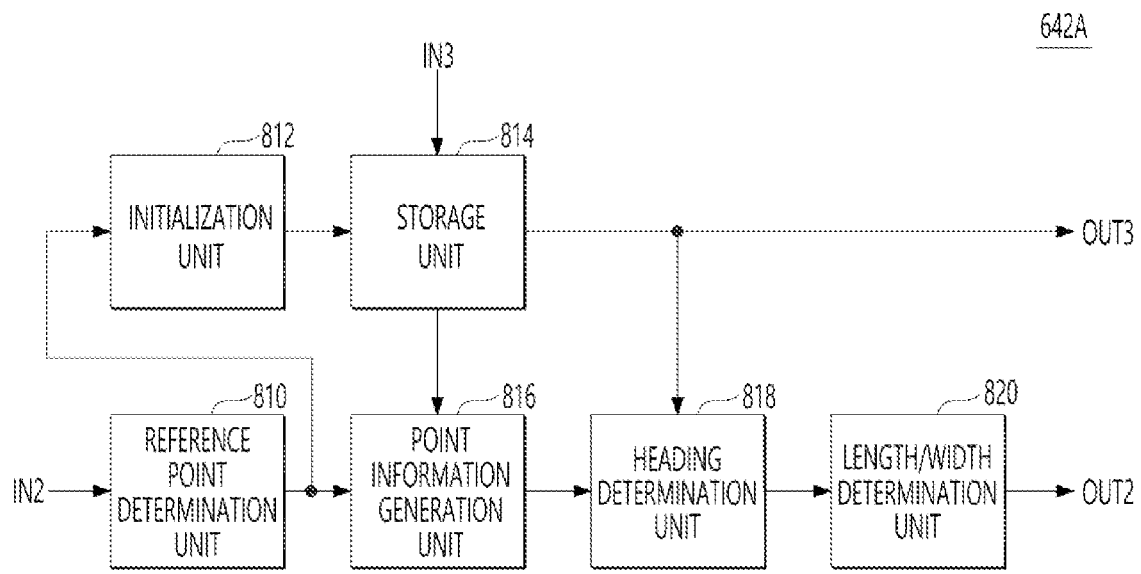
FIG. 6 is a block diagram of an embodiment of the current shape information generation unit shown in FIG. 3.
Figure 7A:
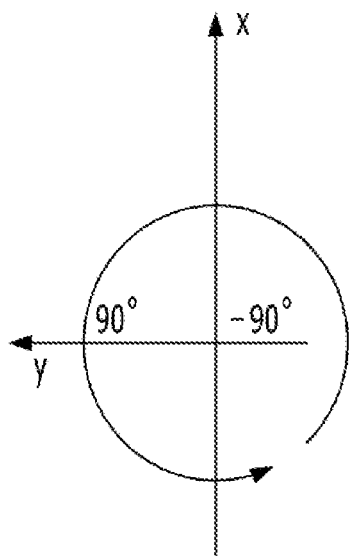
FIGS. 7A to 7C are diagrams for explaining step 410 shown in FIG. 5.
Figure 7B:
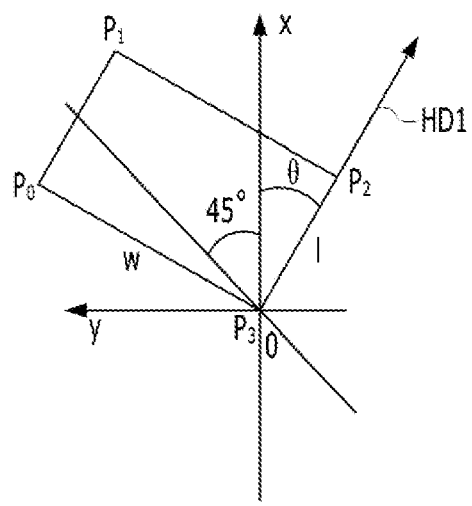
Figure 7C:
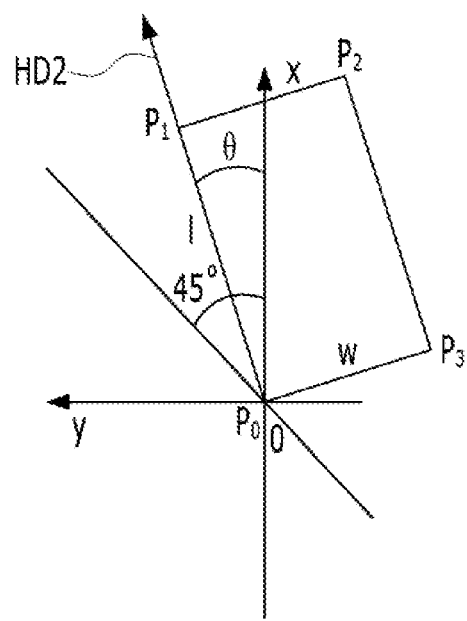

FIG. 5 is a flowchart of an embodiment 400A of step 400 shown in FIG. 1, FIG. 6 is a block diagram of an embodiment 642A of the current shape information generation unit 642 shown in FIG. 3, and FIGS. 7A to 7C are diagrams for explaining step 410 shown in FIG. 5. FIG. 7A shows the coordinates of space in which point cloud data is distributed. "0" shown in FIG. 7B represents the heading angle between the x-axis and heading HD1, and "0" shown in FIG. 7C represents the heading angle between the x-axis and heading HD2.

The current shape information generation unit 642A shown in FIG. 6 may include a reference point determination unit 810, an initialization unit 812, a storage unit 814, a point information generation unit 816, a heading determination unit 818, and a length/width determination unit 820.

For convenience of description, step 400A shown in FIG. 5 will be described as being performed by the current shape information generation unit 642A shown in FIG. 6, but the embodiments are not limited thereto. That is, according to another embodiment, step 400A shown in FIG. 5 may be performed by a current shape information generation unit having a configuration different from that of the current shape information generation unit 642A shown in FIG. 6. In addition, the current shape information generation unit 642A shown in FIG. 6 will be described as performing step 400A shown in FIG. 5, but the embodiments are not limited thereto. That is, according to another embodiment, the current shape information generation unit 642A shown in FIG. 6 may perform step 400 having processes different from those of step 400A shown in FIG. 5.

After step 320, the reference point determination unit 810 determines a reference point of the associated segment box received through an input terminal IN2 (step 410).

Because it is not possible to accurately recognize the heading of the associated segment box, the width and the length of the associated segment box are determined. When the associated segment box has a rectangular shape, among the four line segments connecting the vertices of the associated segment box, the distance between two vertices forming the line segment closer to the y-axis, which is the horizontal axis, is determined to be a "width", and the distance between two vertices forming the line segment extending in a direction perpendicular to the determined width is determined to be a "length".

For example, as shown in FIG. 7B, when the reference point $P_3$ of the associated segment box is determined to be a measurement position, among the four line segments connecting the vertices $P_0$, $P_1$, $P_2$ and $P_3$ of the associated segment box, the distance between two vertices (i.e. $P_0$ and $P_3$) forming the line segment closer to the y-axis, which is the horizontal axis, may be determined to be a width w, and the distance between two vertices (i.e. $P_2$ and $P_3$) forming the line segment extending in a direction perpendicular to the determined width w may be determined to be a length l. In this case, the heading HD1 may be determined to be a direction parallel to the line segment defining the length l.

Alternatively, as shown in FIG. 7C, when the reference point $P_0$ of the associated segment box is determined to be a measurement position, among the four line segments connecting the vertices $P_0$, $P_1$, $P_2$ and $P_3$ of the associated segment box, the distance between two vertices (i.e. $P_0$ and $P_3$) forming the line segment closer to the y-axis, which is the horizontal axis, may be determined to be a width w, and the distance between two vertices (i.e. $P_0$ and $P_1$) forming the line segment extending in a direction perpendicular to the determined width w may be determined to be a length l. In this case, the heading HD2 may be determined to be a direction parallel to the line segment defining the length l.

As shown in FIG. 7B, when the point $P_3$ is selected as the point that is the closest to the origin point 0 from among the four vertices $P_0$, $P_1$, $P_2$ and $P_3$ of the associated segment box and the angle formed by the line segment connecting the point $P_3$ and the point $P_0$ adjacent to the point $P_3$ and the y-axis is less than the angle formed by the line segment connecting the point $P_3$ and the point $P_2$ adjacent to the point $P_3$ and the y-axis, the reference point $P_3$ is determined to be a measurement position. On the other hand, as shown in FIG. 7C, when the point $P_0$ is selected as the point that is the closest to the origin point 0 from among the four vertices $P_0$, $P_1$, $P_2$ and $P_3$ of the associated segment box and the angle formed by the line segment connecting the point $P_0$ and the point $P_3$ adjacent to the point $P_0$ and the y-axis is less than the angle formed by the line segment connecting the point $P_0$ and the point $P_1$ adjacent to the point $P_0$ and the y-axis, the reference point $P_0$ is determined to be a measurement position.

Figure 8A:
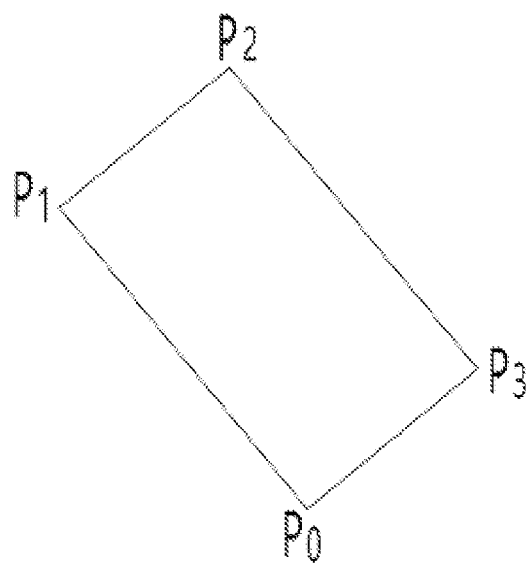
FIGS. 8A and 8B are diagrams for explaining step 420 and step 422 shown in FIG. 5.
Figure 8B:
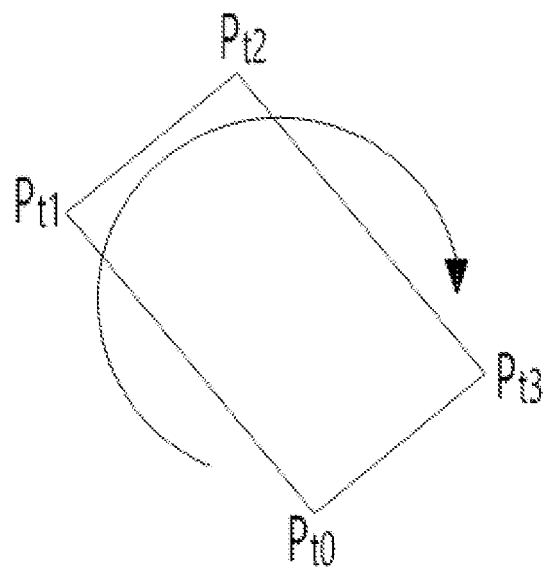

FIGS. 8A and 8B are diagrams for explaining step 420 and step 422 shown in FIG. 5.

After step 410, whether the current tracking channel tracking the target object is initially generated is checked (step 420).

When the current tracking channel tracking the target object is initially generated, information on the current tracking box is generated based on the reference point of the associated segment box obtained when the current tracking channel is initially generated (step 422).

That is, when the current tracking channel is initially generated, information on a tracking box at the previous time t−1 prior to the current time t (hereinafter referred to as a "previous tracking box") is not present. Therefore, in this case, based on the reference point $P_0$ of the associated segment box shown in FIG. 8A, which is determined by the reference point determination unit 810, information on the current tracking box may be generated, as shown in FIG. 8B.

For example, in order to perform step 420 and step 422, when initially generating the current tracking channel tracking the target object, the initialization unit 812 determines the reference point $P_0$ of the associated segment box shown in FIG. 8A to be the reference point $P_{r0}$ of the current tracking box shown in FIG. 8B, and sequentially assigns $P_{r1}$, $P_{r2}$ and $P_{r3}$ to the points of the current tracking box from the reference point $P_{r0}$ of the current tracking box in the clockwise direction. Thereafter, as illustrated in FIGS. 7B to 7C, the initialization unit 814 may respectively determine the heading HD1 or HD2, the length l, and the width w of the determined associated segment box to be the heading, the length, and the width of the current tracking box, which are current shape information of the current tracking box, may determine the determined current tracking box to be a final output box, which will be described later in step 500, and may store the final output box in the storage unit 814. This will be described in detail in the description of step 500, which will be made later.

The storage unit 814 shown in FIG. 6 stores history shape information.

If the current tracking channel tracking the target object was generated at the previous time t−1 rather than being initially generated, the point information generation unit 816 checks the association between the points of the associated segment box, received from the reference point determination unit 810, and the history shape information, stored in the storage unit 814, and generates information on the points of the current tracking box that match the points of the associated segment box using the association (step 430). Here, the history shape information, the association with the associated segment box of which is checked, may be shape information on the previous tracking box that has been tracked and managed, and may include information on the four points of the previous tracking box in which information on the width and the length is contained. For example, when the distance between the points is determined to be a width, the points may be tracked and managed so that the width is continuously output as information on the shape of the previous tracking box that has been tracked and managed.

Figure 9A:
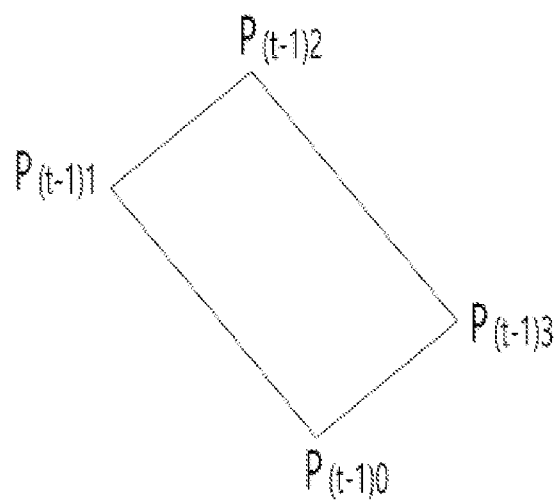
FIGS. 9A and 9B are diagrams for explaining step 430 shown in FIG. 5.
Figure 9B:
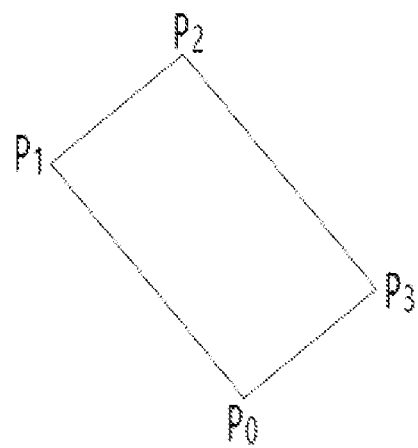

FIGS. 9A and 9B are diagrams for explaining step 430 shown in FIG. 5.

For example, the association between the points $P_{(t-1)0}$, $P_{(t-1)1}$, $P_{(t-1)2}$ and $P_{(t-1)3}$ of the previous tracking box shown in FIG. 9A, which is contained in the history shape information, and the points $P_0$, $P_1$, $P_2$ and $P_3$ of the associated segment box shown in FIG. 9B may be checked.

Figure 10:
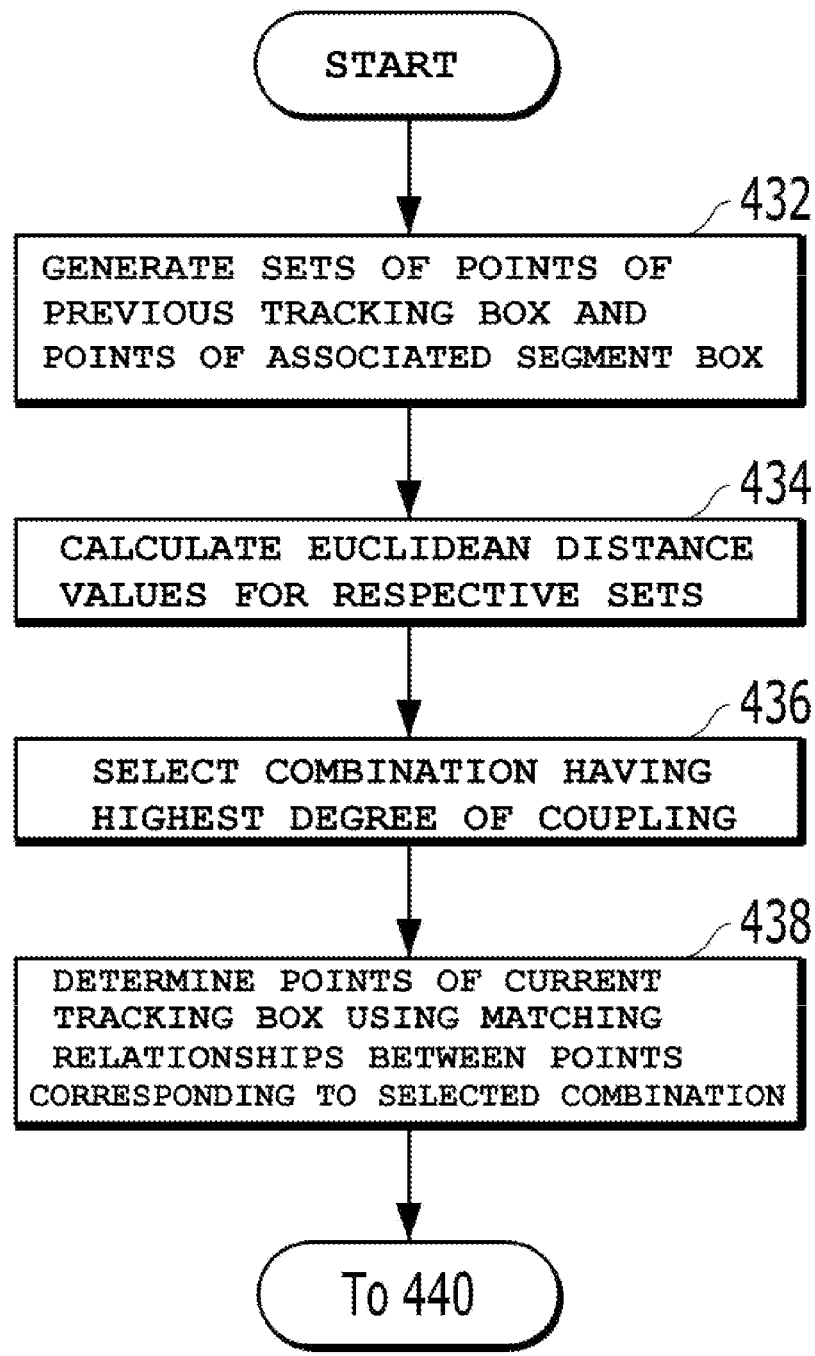
FIG. 10 is a flowchart of an embodiment of step 430 shown in FIG. 5.

FIG. 10 is a flowchart of an embodiment 430A of step 430 shown in FIG. 5.

Step 430A shown in FIG. 10 may be performed by the point information generation unit 816 shown in FIG. 6.

Referring to FIG. 10, a set of the points $P_{(t-1)0}$, $P_{(t-1)1}$, $P_{(t-1)2}$ and $P_{(t-1)3}$ of the previous tracking box shown in FIG. 9A and the points $P_0$, $P_1$, $P_2$ and $P_3$ of the associated segment box shown in FIG. 9B is generated, as expressed using Equation 1 below (step 432).

$$\begin{bmatrix} P_{(t-1)0} \\ P_{(t-1)1} \\ P_{(t-1)2} \\ P_{(t-1)3} \end{bmatrix} \bigcup_{n=4} \text{each} \begin{bmatrix} P_0 \\ P_1 \\ P_2 \\ P_3 \end{bmatrix} = \quad \text{[Equation 1]}$$

$$\begin{bmatrix} (P_{(t-1)0}, P_0)(P_{(t-1)1}, P_1)(P_{(t-1)2}, P_2)(P_{(t-1)3}, P_3) \\ (P_{(t-1)0}, P_1)(P_{(t-1)1}, P_2)(P_{(t-1)2}, P_3)(P_{(t-1)3}, P_0) \\ (P_{(t-1)0}, P_2)(P_{(t-1)1}, P_3)(P_{(t-1)2}, P_0)(P_{(t-1)3}, P_1) \\ (P_{(t-1)0}, P_3)(P_{(t-1)1}, P_0)(P_{(t-1)1}, P_0)(P_{(t-1)3}, P_2) \end{bmatrix}$$

Referring to Equation 1, it can be seen that four sets of the points $P_{(t-1)0}$, $P_{(t-1)1}$, $P_{(t-1)2}$ and $P_{(t-1)3}$, which are the vertices of the previous tracking box, and the points $P_0$, $P_1$, $P_2$ and $P_3$, which are the vertices of the associated segment box, are generated.

After step 432, as expressed using Equation 2 below, Euclidean distance values $_0{}^n\gamma$, $_1{}^n\gamma$, $_2{}^n\gamma$ and $_3{}^n\gamma$ are calculated for the respective sets expressed in Equation 1 (step 434).

$$_0^n\gamma = \sqrt{\left(x_{(t-1)0}^2 + x_0^2\right) + \left(y_{(t-1)0}^2 + y_0^2\right)} \quad \text{[Equation 2]}$$

$$_1^n\gamma = \sqrt{\left(x_{(t-1)0}^2 + x_1^2\right) + \left(y_{(t-1)1}^2 + y_1^2\right)}$$

$$_2^n\gamma = \sqrt{\left(x_{(t-1)2}^2 + x_2^2\right) + \left(y_{(t-1)2}^2 + y_2^2\right)}$$

$$_3^n\gamma = \sqrt{\left(x_{(t-1)3}^2 + x_3^2\right) + \left(y_{(t-1)3}^2 + y_3^2\right)}$$

Here, in the space where the point cloud data is distributed, "$x_{(t-1)0}$" and "$y_{(t-1)0}$" respectively represent the vertical coordinate and the horizontal coordinate of $P_{(t-1)0}$, "$x_{(t-1)1}$" and "$y_{(t-1)1}$" respectively represent the vertical coordinate and the horizontal coordinate of $P_{(t-1)1}$, "$x_{(t-1)2}$" and "$y_{(t-1)2}$" respectively represent the vertical coordinate and the horizontal coordinate of $P_{(t-1)2}$, "$x_{(t-1)3}$" and "$y_{(t-1)3}$" respectively represent the vertical coordinate and the horizontal coordinate of $P_{(t-1)3}$, "$x_0$" and "$y_0$" respectively represent the vertical coordinate and the horizontal coordinate of $P_0$, "$x_1$" and "$y_1$" respectively represent the vertical coordinate and the horizontal coordinate of $P_1$, "$x_2$" and "$y_2$" respectively represent the vertical coordinate and the horizontal coordinate of $P_2$, "$x_3$" and "$y_3$" respectively represent the vertical coordinate and the horizontal coordinate of $P_3$, and n={0, 1, 2, 3}.

After step 434, among four combinations $\delta_0$ to $\delta_3$ expressed in Equation 3 below, the combination having the highest degree of coupling is selected using the Euclidean distance values $_0{}^n\gamma$, $_1{}^n\gamma$, $_2{}^n\gamma$ and $_3{}^n\gamma$ expressed in Equation 2 above (step 436).

$$\delta_0 = (_0^0\gamma + _1^0\gamma + _2^0\gamma + _3^0\gamma)$$

.

.

.

$$\delta_3 = (_0^3\gamma + _1^3\gamma + _2^3\gamma + _3^3\gamma)$$

$$\delta_n = (_0^n\gamma + _1^n\gamma + _2^n\gamma + _3^n\gamma) \quad \text{[Equation 3]}$$

The combination having the highest degree of coupling, which is selected in step 436, is the combination having the smallest one of the sums of the Euclidean distance values $_0{}^n\gamma$, $_1{}^n\gamma$, $_2{}^n\gamma$ and $_3{}^n\gamma$, among the four combinations $\delta_0$ to $\delta_3$ expressed in Equation 3.

After step 436, the points $P_{t0}$, $P_{t1}$, $P_{t2}$ and $P_{t3}$ of the current tracking box are determined using matching relationships between the points corresponding to the combination selected in step 436, among the four combinations $\delta_0$ to $\delta_3$ having matching relationships between the points shown in Table 1 below (step 438).

TABLE 1

| | $^n_0\gamma$ | $^n_1\gamma$ | $^n_2\gamma$ | $^n_3\gamma$ |
|---|---|---|---|---|
| $\delta_0$ | $(P_{t0}, P_0)$ | $(P_{t1}, P_1)$ | $(P_{t2}, P_2)$ | $(P_{t3}, P_3)$ |
| $\delta_1$ | $(P_{t0}, P_1)$ | $(P_{t1}, P_1)$ | $(P_{t2}, P_3)$ | $(P_{t3}, P_0)$ |
| $\delta_2$ | $(P_{t0}, P_2)$ | $(P_{t1}, P_3)$ | $(P_{t2}, P_0)$ | $(P_{t3}, P_1)$ |
| $\delta_3$ | $(P_{t0}, P_3)$ | $(P_{t1}, P_0)$ | $(P_{t2}, P_1)$ | $(P_{t3}, P_2)$ |

If $\delta_3$ is selected in step 436, among the four points $P_0$, $P_1$, $P_2$ and $P_3$ of the associated segment box, $P_3$ is determined to be the point $P_{t0}$ of the current tracking box, $P_0$ is determined to be the point $P_{t1}$ of the current tracking box, $P_1$ is determined to be the point $P_{t2}$ of the current tracking box, and $P_2$ is determined to be the point $P_{t3}$ of the current tracking box, based on what is shown in Table 1 above.

Figure 11:
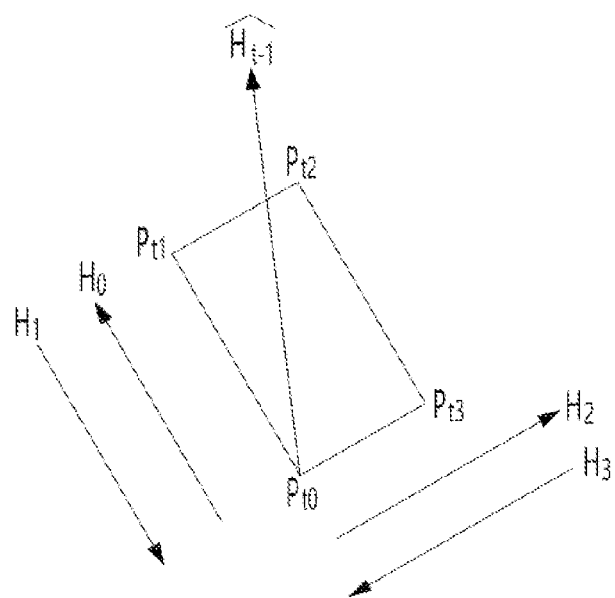
FIG. 11 is a diagram showing a current tracking box obtained by performing step 430 shown in FIG. 5.

FIG. 11 is a diagram showing the current tracking box obtained by performing step 430 shown in FIG. 5.

After step 430, the heading determination unit 818 determines the heading of the current tracking box using heading information $\widehat{H_{t-1}}$ of the tracking channel included in the history shape information based on the reference point $P_{t0}$ among the points $P_{t0}$, $P_{t1}$, $P_{t2}$ and $P_{t3}$ of the current tracking box shown in FIG. 11 (step 440).

For example, the heading $\theta_{BoxHeading}$ of the current tracking box may be determined as shown in Equation 4 below.

$$\theta_{BoxHeading} = \min(|\widehat{H_{t-1}} - H_0|, |\widehat{H_{t-1}} - H_1|, |\widehat{H_{t-1}} - H_2|, |\widehat{H_{t-1}} - H_3|) \quad \text{[Equation 4]}$$

Here, "$H_0$", "$H_1$", "$H_2$" and "$H_3$" represent candidate headings of the current tracking box, and "min(A, B, C, D)" represents the candidate heading that is used when the smallest value among A, B, C and D is calculated. That is, if A is the smallest among A, B, C and D, $H_0$ is determined to be the heading of the current tracking box.

Referring to FIG. 11, the first candidate heading $H_0$ is oriented from the reference point $P_{t0}$ to the point $P_{t1}$, the second candidate heading $H_1$ is oriented from the point $P_{t1}$ to the reference point $P_{t0}$, the third candidate heading $H_2$ is oriented from the reference point $P_{t0}$ to the point $P_{t3}$, and the fourth candidate heading $H_3$ is oriented from the point $P_{t3}$ to the reference point $P_{t0}$. That is, referring to Equation 4, among the first to fourth candidate headings $H_0$, $H_1$, $H_2$ and $H_3$, the candidate heading closest to the heading information $\widehat{H_{t-1}}$ of the tracking channel is determined to be the heading of the current tracking box. For example, in the case of FIG. 11, among the first to fourth candidate headings $H_0$, $H_1$, $H_2$ and $H_3$, the first candidate heading $H_0$ is the closest to the heading information $\widehat{H_{t-1}}$ of the tracking channel, and is thus determined to be the heading of the current tracking box.

Here, the heading information $\widehat{H_{t-1}}$ of the tracking channel may be the heading of the speed-filtered speed vector of the tracking channel.

After step 440, the length/width determination unit 820 may generate information on the length and the width of the current tracking box using the heading determined in step 440, and may output the generated information through an output terminal OUT2 (step 450).

Figure 12:
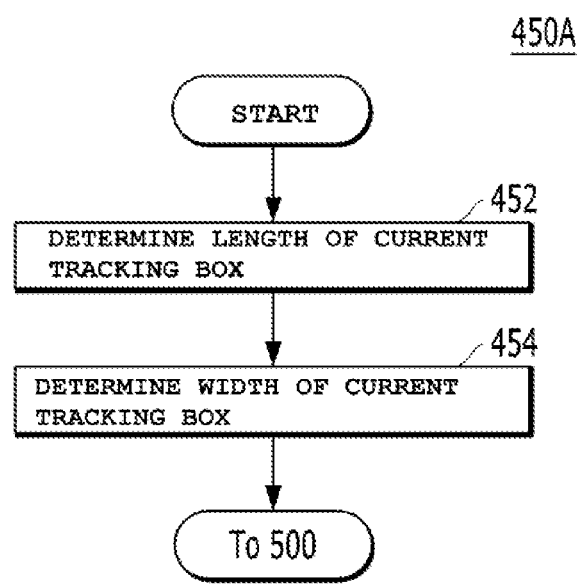
FIG. 12 is a flowchart of an embodiment of step 450 shown in FIG. 5.
Figure 13:
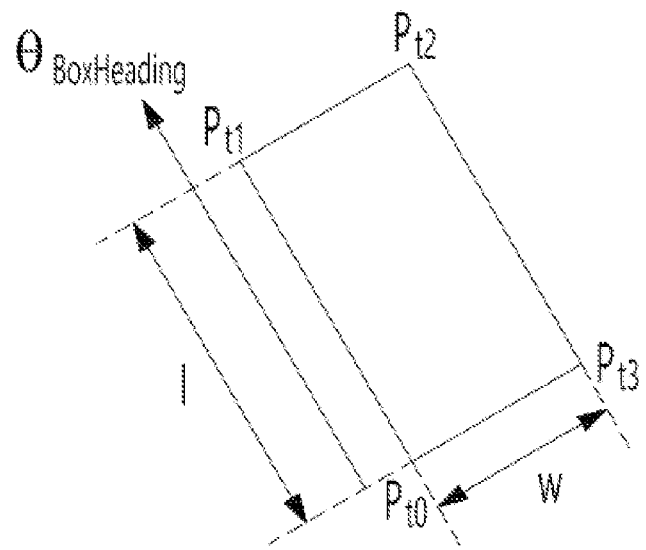
FIG. 13 is a diagram showing a current tracking box having a heading determined in step 440.

FIG. 12 is a flowchart of an embodiment 450A of step 450 shown in FIG. 5, and FIG. 13 is a diagram showing a current tracking box having the heading $\theta_{BoxHeading}$ determined in step 440. Step 450A shown in FIG. 12 may be performed by the length/width determination unit 820.

After step 440, as shown in FIG. 13, the distance between the two vertices $P_{t0}$ and $P_{t1}$, which form a line segment parallel to the heading $\theta_{BoxHeading}$ of the current tracking box, may be determined to be the length l of the current tracking box (step 452).

After step 452, as shown in FIG. 13, the distance between the two vertices $P_{t0}$ and $P_{t3}$, which form a line segment perpendicular to the heading $\theta_{BoxHeading}$ of the current tracking box, may be determined to be the width w of the current tracking box (step 454).

Although it is illustrated in FIG. 12 that step 454 is performed after step 452 is performed, the embodiments are not limited thereto. That is, step 452 may be performed after step 454 is performed, or step 452 and step 454 may be performed simultaneously.

Referring again to FIGS. 1 and 3, after step 400, the final output box generation unit 644 updates information on the previous tracking box contained in the history shape information using the current shape information and the history shape information, and outputs the previous tracking box having the updated information as a final output box containing information on the shape of the target object through an output terminal OUT1 (step 500). To this end, the length and the width generated by the length/width determination unit 820 of the current shape information generation unit 642A may be output to the final output box output unit 644 as current shape information through the output terminal OUT2, and the history shape information stored in the storage unit 814 may be output to the final output box output unit 644 through an output terminal OUT3. In addition, the heading of the current tracking box generated by the heading determination unit 818 may be output to the final output box output unit 644 through the output terminal OUT3.

For example, the history shape information used to generate the final output box at the current time t may include information on identification (ID), a position, a speed, a heading, a width, and a length. As described above, the history shape information may include information on the previous tracking box, and may be stored in the storage unit 814.

In addition, the information on the final output box generated in the above-described step 422 and stored in the storage unit 814 may correspond to history shape information that is necessary in order to generate a tracking box at the subsequent time t+1, subsequent to the current time t (hereinafter referred to as a "subsequent tracking box").

Figure 14A:
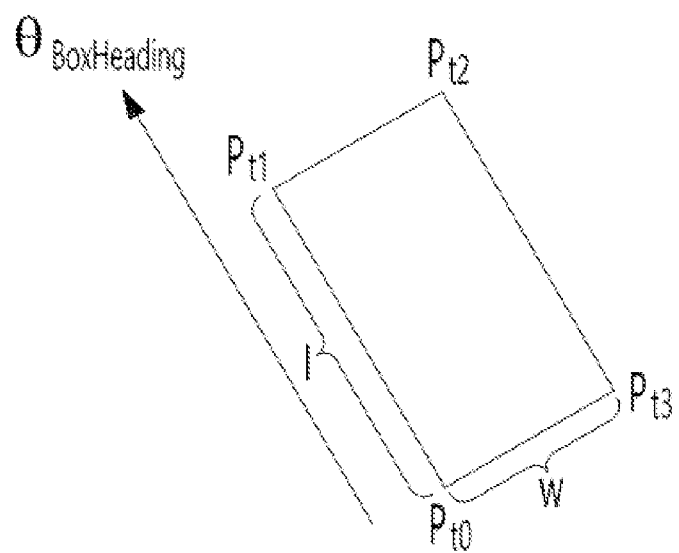
FIGS. 14A to 14C are diagrams for helping understanding step 500.
Figure 14B:
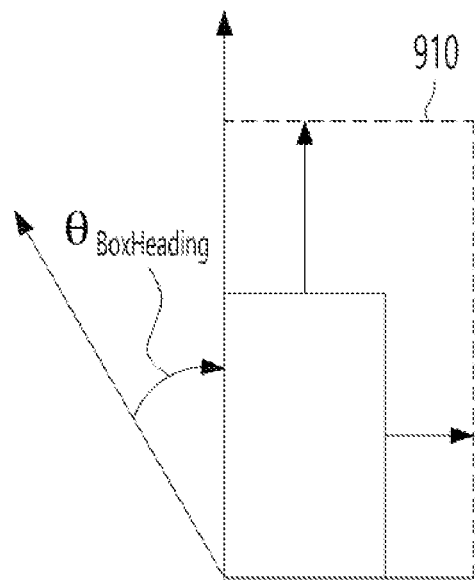
Figure 14C:
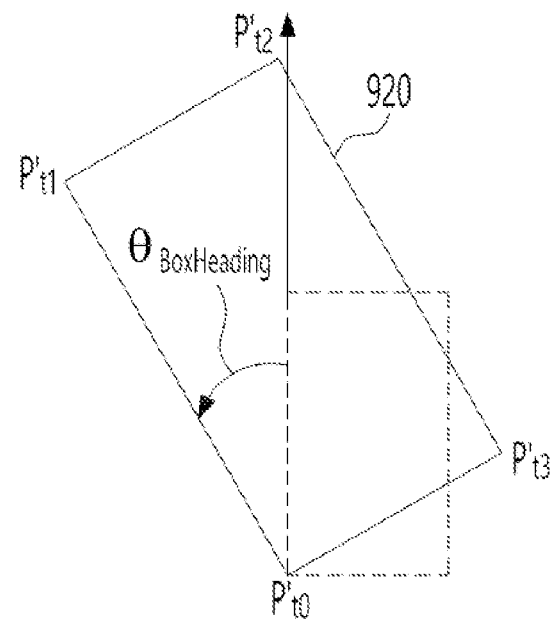

FIGS. 14A to 14C are diagrams for helping understanding step 500. Specifically, FIG. 14A shows the current tracking box having the current shape information obtained in step 400, FIG. 14B shows the previous tracking box of the tracking channel included in the history shape information, and FIG. 14C shows the final output box.

The current shape information of the current tracking box shown in FIG. 14A may include a heading $\theta_{BoxHeading}$, a length l, and a width w. The heading of the previous tracking box 910 shown in FIG. 14B is updated to the heading $\theta_{BoxHeading}$ of the current tracking box shown in FIG. 14A, and the length l and the width w of the current tracking box shown in FIG. 14A are increased by the length and the width of the previous tracking box 910 shown in FIG. 14B, thereby generating the final output box, as shown in FIG. 14C. In FIG. 14C, "$P'_{t0}$", "$P'_{t1}$", "$P'_{t2}$" and "$P'_{t3}$" represent the points of the final output box.

In addition, since the information on the final tracking box obtained at the current time t is necessary when the subsequent tracking box is generated, the final output box output unit 644 may output the final output box to the storage unit 814 shown in FIG. 6 through the output terminal OUT3. The storage unit 814 may receive the final output box output from the final output box output unit 644 through an input terminal IN3, and may store the same. The final output box stored in the storage unit 814 may be used as history shape information when the subsequent tracking box is generated.

Due to the characteristics of the LiDAR sensor 710, the shape detected thereby varies depending on whether a line of sight is secured and a measurement position. Further, because a tracking channel estimates and manages a shape using history shape information, a shape may differ from that of the measured segment box. Furthermore, when a single object is clustered into several pieces and thus multiple separate segment boxes are generated, tracking channels may be merged to reconstruct shape information. Therefore, as in step 500, the final output box may be reconstructed (for example, expanded or contracted) by updating the width and the length of the previous tracking box of the tracking channel based on the reference point $P_{r0}$ of the current tracking box.

Referring to FIG. 2, for example, when the object-tracking method and apparatus 600 described above are used in the vehicle 1000, the vehicle 1000 may further include a vehicle device 700. The vehicle device 700 may control the vehicle 1000 based on the information on the target object tracked by the object-tracking unit 640 and the type of target object.

The vehicle device 700 may receive information on the object determined by the object-tracking apparatus 600, and may control the vehicle 1000 based thereon. For example, the vehicle device 700 may include a lane-keeping assist system for preventing the vehicle from deviating from a lane while maintaining the distance to a preceding vehicle, an obstacle detection system for detecting obstacles present around the vehicle, a collision prevention system for detecting the risk of a collision, an autonomous driving system for controlling the vehicle to travel autonomously through detecting obstacles present ahead of the vehicle, and a safe driving system for warning of the approach of another vehicle to assist in safe driving of the vehicle.

A non-transitory computer readable recording medium in which a program for executing the method of tracking an object using the LiDAR sensor 710 is recorded may store a program for implementing a function of generating current shape information about a current tracking box at the current time from an associated segment box using history shape information accumulated prior to the current time with respect to a target object that is being tracked and a function of updating a previous tracking box at a time prior to the current time, contained in the history shape information, using the current shape information and the history shape information and determining the updated previous tracking box to be the final output box containing information on the shape of the target object.

In addition, the recording medium may store a program for implementing a function of clustering point cloud data obtained using the LiDAR sensor, a function of obtaining a plurality of segment boxes from the result of clustering, and a function of selecting the associated segment box associated with the target object from among the plurality of segment boxes related to the target object.

In addition, the function of generating the current shape information may include a function of determining a reference point of the associated segment box, a function of checking the association between the points of the associated segment box and the history shape information and generating information on the points of the current tracking box that match the points of the associated segment box using the association, a function of determining the heading of the current tracking box using heading information included in the history shape information based on a reference point among the points of the current tracking box, and a function of generating information on the length and the width of the current tracking box using the determined heading.

In addition, the recording medium may store a program for further implementing a function of generating information on the current tracking box based on the reference point of the associated segment box that is obtained when the current tracking channel tracking the target object is initially generated. The recording medium may be read by a computer system.

The non-transitory computer-readable recording medium includes all kinds of recording devices in which data capable of being read by a computer system are stored. Examples of the computer-readable recording medium include a Read-Only Memory (ROM), a Random Access Memory (RAM), a Compact Disk ROM (CD-ROM), a magnetic tape, a floppy disc, and an optical data storage. The computer-readable recording medium can also be distributed over network-connected computer systems so that the computer-readable code is stored and executed in a distributed fashion. Also, functional programs, code, and code segments for accomplishing the object-tracking method can be easily devised by programmers skilled in the art to which the present disclosure pertains.

Hereinafter, an object-tracking method according to a comparative example and the object-tracking method according to the embodiment will be described with reference to the accompanying drawings.

FIGS. 15A to 15D are diagrams for comparing the object-tracking method according to the comparative example and the object-tracking method according to the embodiment with each other.

Because the LiDAR sensor 710 is not capable of generating speed information based on a single measurement, it may not be possible to recognize the heading of the associated segment box, and it may be difficult to generate a width and a length, which are shape information. Further, it may be difficult to accurately estimate shape information about the box of the tracking channel depending on the environment in which the vehicle travels in various way and the mounting position and the line of sight of the LiDAR sensor 710. Furthermore, because tracking points are changed depending on the positions at which the tracking points can be seen in the line of sight of the LiDAR sensor 710, there may be problems in tracking stability and accuracy.

Figure 15A:
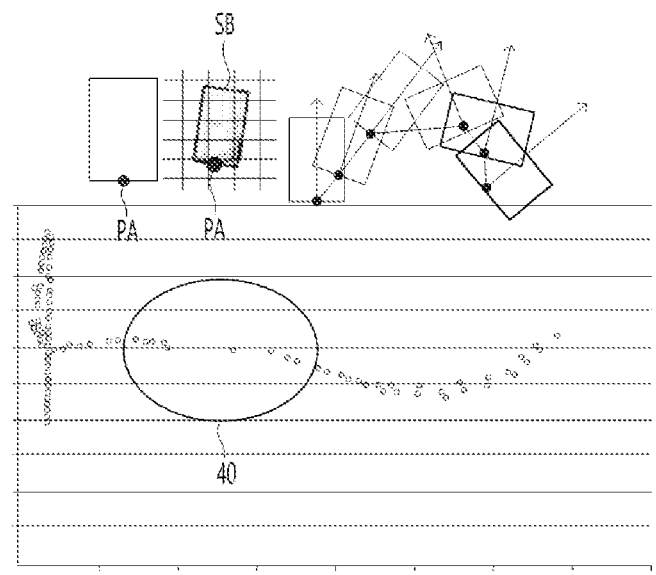
FIGS. 15A to 15D are diagrams for comparing an object-tracking method according to a comparative example and the object-tracking method according to the embodiment with each other.
Figure 15B:
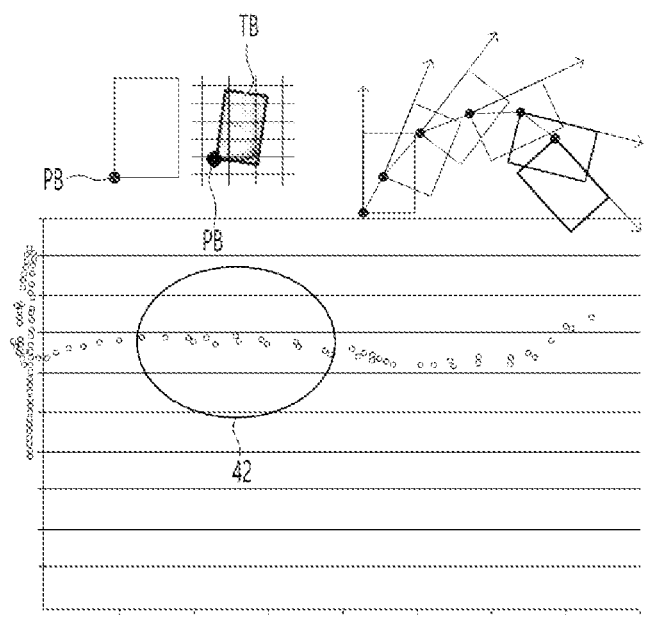
Figure 15C:
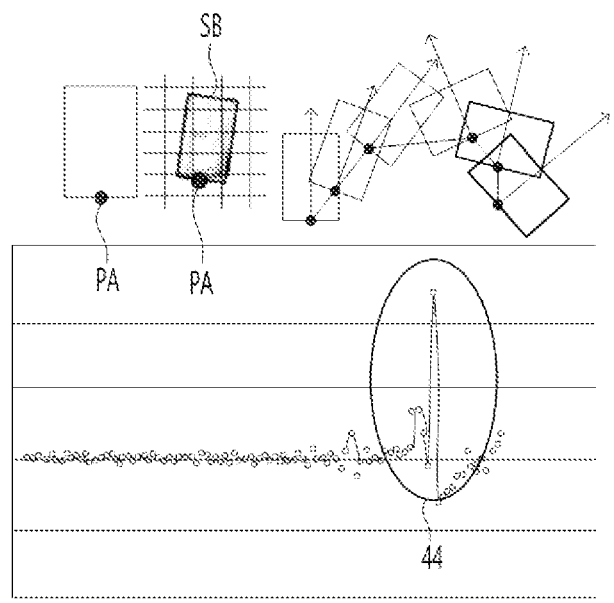

The center of the segment box SB varies greatly depending on a change in the shape thereof. Therefore, in the case of the object-tracking method according to the comparative example, in order to improve tracking accuracy, a target object is tracked by selecting the center PA of the rear surface of the target object, from which the greatest number of points are extracted based on the host vehicle, as a tracking point, as shown in FIGS. 15A and 15C. However, in the object-tracking method according to the comparative example, it may not be possible to determine the center PA of the rear surface of a target vehicle depending on the behavior of the target vehicle. Thus, in many cases, a tracking error may further increase. That is, in the case in which the target object is a vehicle that is moving, a measurement position is changed because the heading of the target object is not accurately recognized due to the characteristics of the segment box when tracking a target object that is moving using the center PA of the rear surface of the target object as a tracking point. Accordingly, as shown in FIG. 15A, a positional error 40 may occur. The positional error 40 may further increase depending on the shape of the target object that is moving, whereby the target object that is being tracked may be missed. In this case, a big problem may occur in a system that utilizes LiDAR information due to errors in width and length, which are shape information of the object and important input data for maintenance of tracking information, and the change in the heading.

In contrast, according to the embodiment, measurement values initially selected by tracking the shape of the segment box are selected as the points of the previous tracking box, and the measurement position is stably applied to tracking by continuously tracking the shape of the object. Accordingly, as shown in FIG. 15B, the positional error is improved (refer to reference numeral 42), and thus tracking stability is further secured.

In addition, according to the embodiment, measurement values initially selected by tracking the shape of the segment box are selected as the points of the tracking box, and the measurement position is stably applied to tracking by continuously tracking the shape of the object, thereby improving tracking accuracy. Specifically, referring to FIG. 15D, it can be seen that a positional error 44 in the lateral direction shown in FIG. 15C, which is caused by an error in the shape information of the segment box in the comparative example, is reduced to about 1/16 of an original value thereof (refer to reference numeral 46).

Figure 16A:
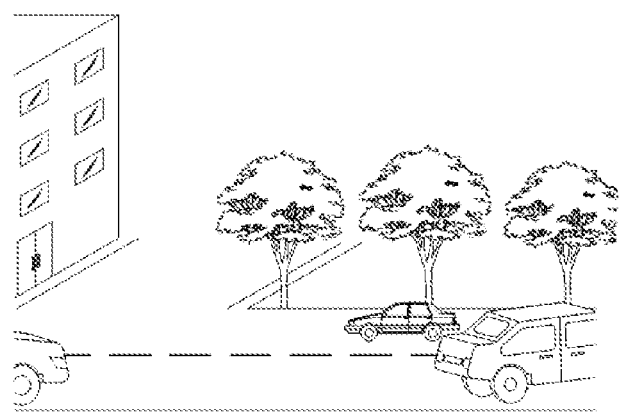
FIGS. 16A to 16C are diagrams for explaining the object-tracking method according to the comparative example.
Figure 16B:
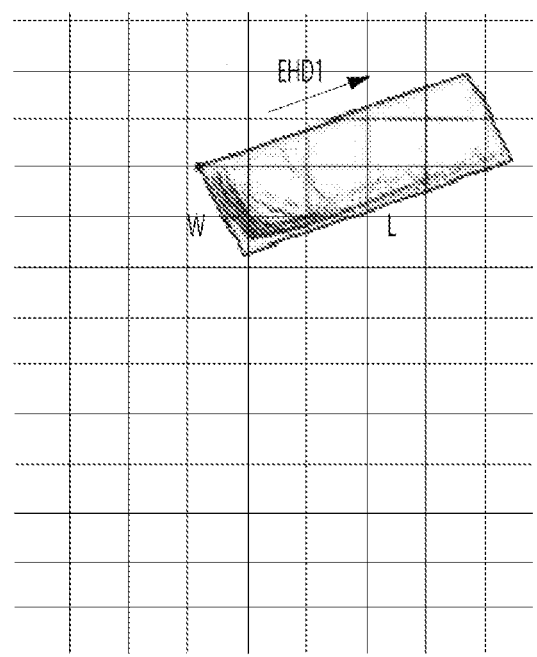
Figure 16C:
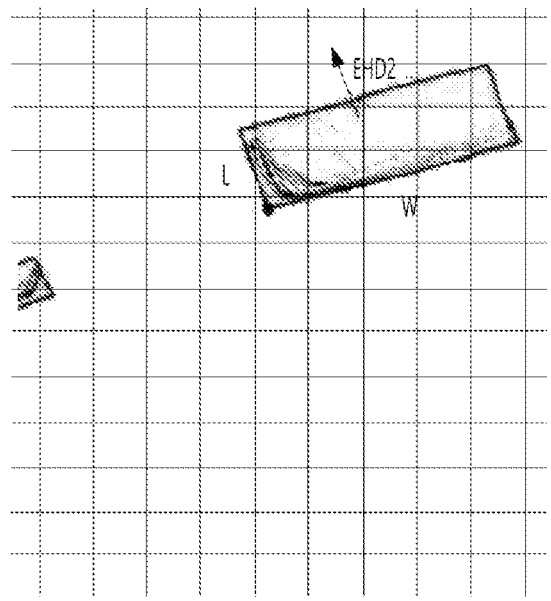

FIGS. 16A to 16C are diagrams for explaining the object-tracking method according to the comparative example.

On the assumption that the host vehicle acquires LiDAR data on the surrounding environment shown in FIG. 16A and that, as shown in FIGS. 7B and 7C, the line segment oriented parallel to the heading is determined to be the length l and the line segment oriented perpendicular to the heading is determined to be the width w, when the headings EHD1 and EHD2 are changed as shown in FIGS. 16B and 16C, the length l and the width w are also changed, thus adversely affecting the speed information of the target object.

Figure 15D:
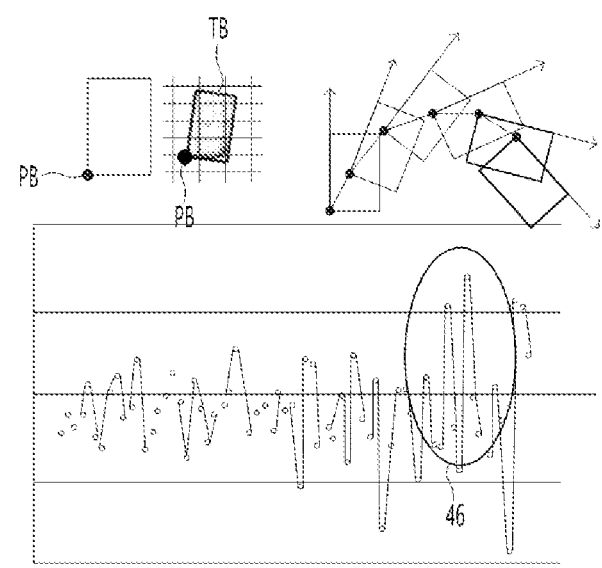

In contrast, according to the embodiment, a tracking box is generated from the segment box using the history shape information, and, as shown in FIGS. 15B and 15D, the reference point PB of the tracking box TB is continuously used as a tracking point, thereby reducing errors in the position, heading, width and length of the target object that is being tracked. Considering that an error in the measurement position (or the reference point) of the associated segment box greatly affects tracking stability and accuracy, the embodiment uses the history shape information instead of the associated segment box. That is, the embodiment tracks the target object using the current tracking box generated from the associated segment box, thereby reducing an error in the measurement position of the associated segment box.

Figure 17A:
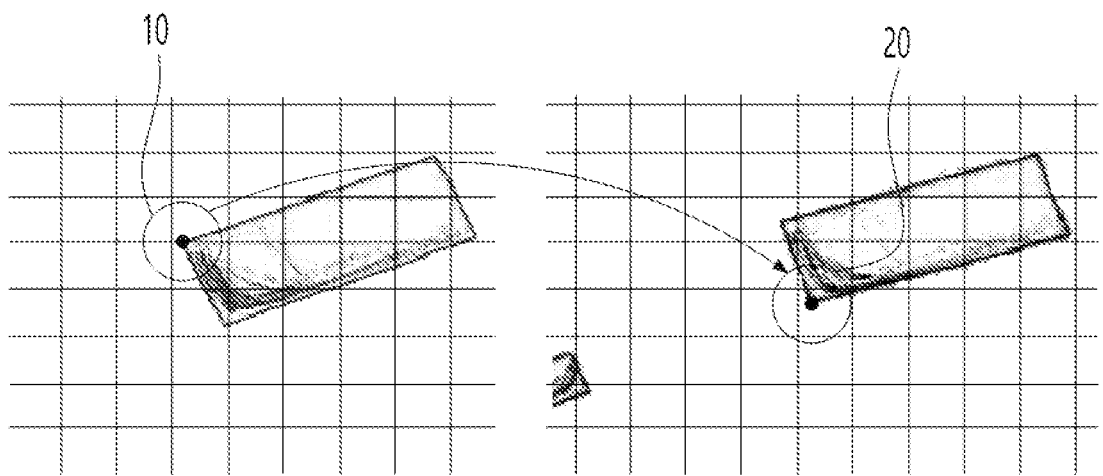
FIGS. 17A to 17C are diagrams for comparing the object-tracking method according to the comparative example and the object-tracking method according to the embodiment with each other.
Figure 17B:
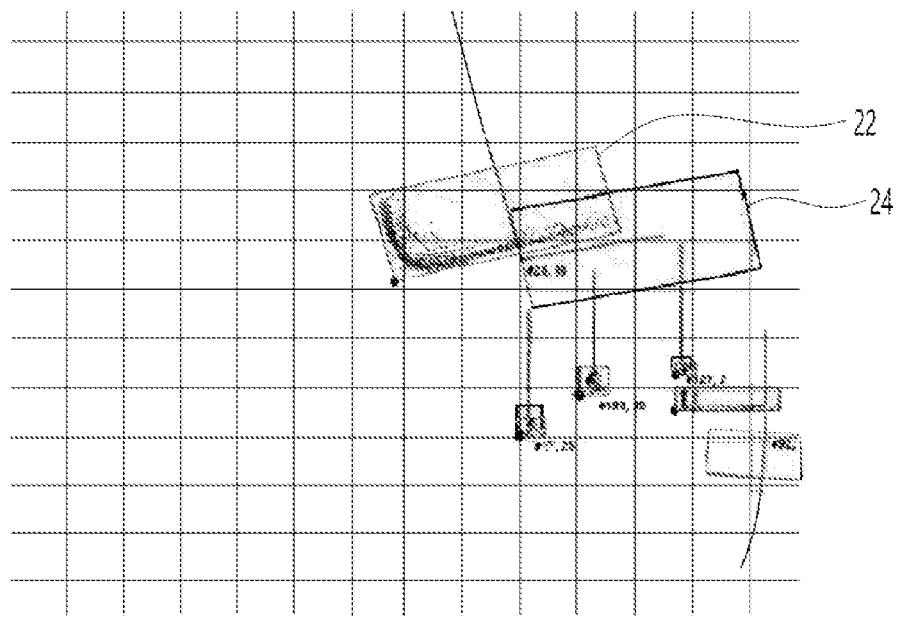
Figure 17C:
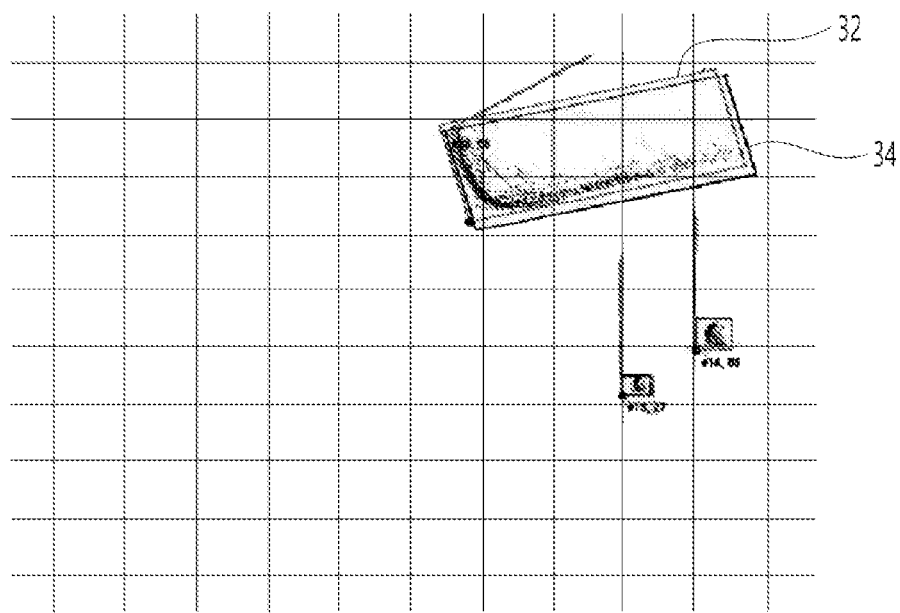

FIGS. 17A to 17C are diagrams for comparing the object-tracking method according to the comparative example and the object-tracking method according to the embodiment with each other. FIGS. 17A to 17C show the results of tracking an object in the surrounding environment shown in FIG. 16A.

When the measurement position 10 of the segment box is changed to the measurement position 20 of the segment box shown in FIG. 17A, in the case of the object-tracking method according to the comparative example, information on the widths, the lengths and the headings of boxes 22 and 24 is also changed, as shown in FIG. 17B, whereby a large tracking error between the boxes 22 and 24 occurs, leading to deterioration in the tracking stability and inaccurate determination of the system. In contrast, according to the embodiment, as shown in FIG. 17C, the tracking error between boxes 32 and 34 is not large, and thus tracking stability and accuracy are greatly improved.

As is apparent from the above description, according to the method and apparatus for tracking an object using a LiDAR sensor and the recording medium storing a program to execute the method according to the embodiments, it is possible to accurately track a target object using the LiDAR sensor with no error or with minimal error.

The above-described various embodiments may be combined with each other without departing from the scope of the present disclosure unless they are incompatible with each other. In addition, for any element or process that is not described in detail in any of the various embodiments, reference may be made to the description of an element or a process having the same reference numeral in another embodiment unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A method of tracking an object using a LiDAR sensor, the method comprising:
   determining a reference point of an associated segment box related to a target object, generated from point cloud data;
   checking an association between points of the associated segment box and history shape information accumulated prior to a current time with respect to the target object and generating information on points of a current tracking box at the current time that match points of the associated segment box using the association;
   determining a heading of the current tracking box using heading information included in the history shape information based on a reference point among the points of the current tracking box;
   obtaining a length and a width of the current tracking box using the determined heading; and
   updating information on a tracking box generated prior to the current time, included in the history shape information, using the heading, the length and the width of the current tracking box, and determining the tracking box having the updated information to be a final output box containing information on a shape of the target object.

2. A method of tracking an object using a LiDAR sensor, the method comprising:
   generating current shape information about a current tracking box at a current time from an associated segment box using history shape information accumulated prior to the current time with respect to a target object that is being tracked; and
   updating information on a previous tracking box at a time prior to the current time, contained in the history shape information, using the current shape information and the history shape information, and determining a previous tracking box having the updated information to be a final output box containing information on a shape of the target object.

3. The method according to claim 2, further comprising:
   clustering point cloud data obtained using the LiDAR sensor;
   obtaining a plurality of segment boxes from a result of clustering the point cloud data; and
   selecting the associated segment box associated with the target object from among the plurality of segment boxes related to the target object.

4. The method according to claim 3, wherein generating the current shape information comprises:
- determining a reference point of the associated segment box;
- checking an association between points of the associated segment box and the history shape information, and obtaining information on points of the current tracking box that match the points of the associated segment box using the association;
- determining a heading of the current tracking box using heading information included in the history shape information based on a reference point among the points of the current tracking box; and
- generating information on a length and a width of the current tracking box using the determined heading.

5. The method according to claim 4, further comprising:
- generating the current shape information about the current tracking box based on the reference point of the associated segment box obtained when a current tracking channel tracking the target object is initially generated.

6. The method according to claim 4, wherein obtaining the information on the points of the current tracking box comprises:
- generating sets of points of the previous tracking box and the points of the associated segment box as follows:

$$\begin{bmatrix} P_{(t-1)0} \\ P_{(t-1)1} \\ P_{(t-1)2} \\ P_{(t-1)3} \end{bmatrix} \bigcup_{n=4} \text{each} \begin{bmatrix} P_0 \\ P_1 \\ P_2 \\ P_3 \end{bmatrix} =$$

$$\begin{bmatrix} (P_{(t-1)0}, P_0)(P_{(t-1)1}, P_1)(P_{(t-1)2}, P_2)(P_{(t-1)3}, P_3) \\ (P_{(t-1)0}, P_1)(P_{(t-1)1}, P_2)(P_{(t-1)2}, P_3)(P_{(t-1)3}, P_0) \\ (P_{(t-1)0}, P_2)(P_{(t-1)1}, P_3)(P_{(t-1)2}, P_0)(P_{(t-1)3}, P_1) \\ (P_{(t-1)0}, P_3)(P_{(t-1)1}, P_0)(P_{(t-1)2}, P_1)(P_{(t-1)3}, P_2) \end{bmatrix}$$

where $P_{(t-1)0}$, $P_{(t-1)1}$, $P_{(t-1)2}$ and $P_{(t-1)3}$ represent the points of the previous tracking box, and $P_0$, $P_1$, $P_2$ and $P_3$ represent the points of the associated segment box;

calculating Euclidean distance values for the sets as follows:

$$^n_0\gamma = \sqrt{(x^2_{(t-1)0} + x^2_0) + (y^2_{(t-1)0} + y^2_0)}$$

$$^n_1\gamma = \sqrt{(x^2_{(t-1)0} + x^2_1) + (y^2_{(t-1)1} + y^2_1)}$$

$$^n_2\gamma = \sqrt{(x^2_{(t-1)2} + x^2_2) + (y^2_{(t-1)2} + y^2_2)}$$

$$^n_3\gamma = \sqrt{(x^2_{(t-1)3} + x^2_3) + (y^2_{(t-1)3} + y^2_3)}$$

where $^n_0\gamma$, $^n_1\gamma$, $^n_2\gamma$ and $^n_3\gamma$ represent the Euclidean distance values, and where, in a space where the point cloud data is distributed, $x_{(t-1)0}$ and $y_{(t-1)0}$ respectively represent a vertical coordinate and a horizontal coordinate of $P_{(t-1)0}$, $x_{(t-1)1}$ and $y_{(t-1)1}$ respectively represent a vertical coordinate and a horizontal coordinate of $P_{(t-1)1}$, $x_{(t-1)2}$ and $y_{(t-1)2}$ respectively represent a vertical coordinate and a horizontal coordinate of $P_{(t-1)2}$, $x_{(t-1)3}$ and $y_{(t-1)3}$ respectively represent a vertical coordinate and a horizontal coordinate of $P_{(t-1)3}$, $x_0$ and $y_0$ respectively represent a vertical coordinate and a horizontal coordinate of $P_0$, $x_1$ and $y_1$ respectively represent a vertical coordinate and a horizontal coordinate of $P_1$, $x_2$ and $y_2$ respectively represent a vertical coordinate and a horizontal coordinate of $P_2$, $x_3$ and $y_3$ respectively represent a vertical coordinate and a horizontal coordinate of $P_3$, and n={0, 1, 2, 3};

selecting a combination having a highest degree of coupling from among four combinations below using the Euclidean distance values as follows:

$$\delta_0 = (^0_0\gamma + ^0_1\gamma + ^0_2\gamma + ^0_3\gamma)$$

.

.

.

$$\delta_3 = (^3_0\gamma + ^3_1\gamma + ^3_2\gamma + ^3_3\gamma)$$

$$\delta_n = (^n_0\gamma + ^n_1\gamma + ^n_2\gamma + ^n_3\gamma)$$

where $\delta_0$ to $\delta_3$ represent the four combinations, and the combination having the highest degree of coupling corresponds to a combination having a smallest value among $\delta_0$ to $\delta_3$; and determining, among matching relationships between points of the four combinations shown below, points of the current tracking box using matching relationships corresponding to the selected combination:

| | $^n_0\gamma$ | $^n_1\gamma$ | $^n_2\gamma$ | $^n_3\gamma$ |
|---|---|---|---|---|
| $\delta_0$ | $(P_{t0}, P_0)$ | $(P_{t1}, P_1)$ | $(P_{t2}, P_2)$ | $(P_{t3}, P_3)$ |
| $\delta_1$ | $(P_{t0}, P_1)$ | $(P_{t1}, P_1)$ | $(P_{t2}, P_3)$ | $(P_{t3}, P_0)$ |
| $\delta_2$ | $(P_{t0}, P_2)$ | $(P_{t1}, P_3)$ | $(P_{t2}, P_0)$ | $(P_{t3}, P_1)$ |
| $\delta_3$ | $(P_{t0}, P_3)$ | $(P_{t1}, P_0)$ | $(P_{t2}, P_1)$ | $(P_{t3}, P_2)$ | where $P_{t0}$, $P_{t1}$, $P_{t2}$ and $P_{t3}$ represent the points of the current tracking box.

7. The method according to claim 4, wherein the heading of the current tracking box is determined as follows:

$$\theta_{BoxHeading} = \min(|\overrightarrow{H_{t-1}} - H_0|, |\overrightarrow{H_{t-1}} - H_1|, |\overrightarrow{H_{t-1}} - H_2|, |\overrightarrow{H_{t-1}} - H_3|)$$

where $\theta_{BoxHeading}$ represents the heading of the current tracking box, $\overrightarrow{H_{t-1}}$ represents heading information included in the history shape information, $H_0$, $H_1$, $H_2$ and $H_3$ represent candidate headings of the current tracking box, and min(A, B, C, D) represents a candidate heading that is used when a smallest value among A, B, C and D is calculated.

8. The method according to claim 4, wherein the obtaining the current shape information comprises:
- determining a distance between two vertices forming a line segment oriented parallel to the heading of the current tracking box to be the length of the current tracking box; and
- determining a distance between two vertices forming a line segment oriented perpendicular to the heading of the current tracking box to be the width of the current tracking box.

9. An apparatus for tracking an object using a LiDAR sensor, the apparatus comprising:
- a current shape information generation unit configured to generate current shape information about a current tracking box at a current time from an associated segment box, using history shape information accumulated prior to the current time with respect to a target object that is being tracked; and a final output box output unit configured to update information on a previous tracking box at a time prior to the current time, contained in the history shape information, using the current shape information and the history shape information, and to output a previous tracking box having the updated information as a final output box containing information on a shape of the target object.

10. The apparatus according to claim 9, further comprising:
a clustering unit configured to cluster point cloud data obtained using the LiDAR sensor;
a shape analysis unit configured to obtain a plurality of segment boxes from a result of clustering by the clustering unit; and
an associated segment box selection unit configured to select the associated segment box associated with the target object from among the plurality of segment boxes related to the target object.

11. The apparatus according to claim 10, wherein the current shape information generation unit comprises:
a reference point determination unit configured to determine a reference point of the associated segment box;
a point information generation unit configured to check an association between points of the associated segment box and the history shape information, and to generate information on points of the current tracking box that match the points of the associated segment box using the association;
a heading determination unit configured to determine a heading of the current tracking box using heading information included in the history shape information based on a reference point among the points of the current tracking box; and
a length/width determination unit configured to determine information on a length and a width of the current tracking box using the determined heading.

12. The apparatus according to claim 11, wherein the current shape information generation unit further comprises:
an initialization unit configured to generate the current shape information about the current tracking box based on the reference point of the associated segment box when a current tracking channel tracking the target object is initially generated.

13. A non-transitory computer-readable recording medium in which a program for executing a method of tracking an object using a LiDAR sensor is recorded, the recording medium storing a program to implement:

a function of obtaining current shape information about a current tracking box at a current time from an associated segment box using history shape information accumulated prior to the current time with respect to a target object that is being tracked; and
a function of updating information on a previous tracking box at a time prior to the current time, contained in the history shape information, using the current shape information and the history shape information, and determining a previous tracking box having the updated information to be a final output box containing information on a shape of the target object.

14. The recording medium according to claim 13, wherein the program further implements:
a function of clustering point cloud data obtained using the LiDAR sensor;
a function of obtaining a plurality of segment boxes from a result of clustering; and
a function of selecting the associated segment box associated with the target object from among the plurality of segment boxes related to the target object.

15. The recording medium according to claim 14, wherein the function of obtaining the current shape information comprises:
a function of determining a reference point of the associated segment box;
a function of checking an association between points of the associated segment box and the history shape information, and generating information on points of the current tracking box that match the points of the associated segment box using the association;
a function of determining a heading of the current tracking box using heading information included in the history shape information based on a reference point among the points of the current tracking box; and
a function of obtaining information on a length and a width of the current tracking box using the determined heading.

16. The recording medium according to claim 15, wherein the function of obtaining the current shape information further comprises:
a function of generating the current shape information about the current tracking box based on the reference point of the associated segment box obtained when a current tracking channel tracking the target object is initially generated.

* * * * *